United States Patent
Fex et al.

(10) Patent No.: US 12,435,072 B2
(45) Date of Patent: Oct. 7, 2025

(54) COMPOUNDS

(71) Applicant: Vicore Pharma AB, Stockholm (SE)

(72) Inventors: Tomas Fex, Mölndal (SE); Bengt Ohlsson, Mölndal (SE)

(73) Assignee: Vicore Pharma AB, Stockholm (SE)

( * ) Notice: Subject to any disclaimer, the term of this patent is extended or adjusted under 35 U.S.C. 154(b) by 756 days.

(21) Appl. No.: 17/761,670

(22) PCT Filed: Sep. 18, 2020

(86) PCT No.: PCT/GB2020/052261
§ 371 (c)(1),
(2) Date: Mar. 18, 2022

(87) PCT Pub. No.: WO2021/053344
PCT Pub. Date: Mar. 25, 2021

(65) Prior Publication Data
US 2022/0388994 A1 Dec. 8, 2022

(30) Foreign Application Priority Data
Sep. 20, 2019 (GB) .................................... 1913603

(51) Int. Cl.
*C07D 409/10* (2006.01)
*C07D 409/14* (2006.01)

(52) U.S. Cl.
CPC ......... *C07D 409/10* (2013.01); *C07D 409/14* (2013.01)

(58) Field of Classification Search
CPC .................................................. C07D 409/10
See application file for complete search history.

(56) References Cited

U.S. PATENT DOCUMENTS

| | | | |
|---|---|---|---|
| 5,444,067 A | 8/1995 | Kivlighn et al. | |
| 8,835,471 B2 * | 9/2014 | Steckelings ........ | A61K 31/4178 548/315.1 |
| 2002/0077344 A1 | 6/2002 | Heitsch et al. | |
| 2004/0167176 A1 | 8/2004 | Alterman et al. | |
| 2012/0035232 A1 | 2/2012 | Steckelings et al. | |

FOREIGN PATENT DOCUMENTS

| | | |
|---|---|---|
| DE | 19920815 A1 | 11/2000 |
| EP | 2832357 A1 | 2/2015 |
| JP | 2004-533457 A | 11/2004 |
| WO | 1999/043339 A1 | 9/1999 |
| WO | 2000/068226 A1 | 11/2000 |
| WO | 2002/096883 A1 | 12/2002 |
| WO | 2004/046141 A1 | 6/2004 |
| WO | 2006/109048 A1 | 10/2006 |
| WO | 2013/090833 A1 | 6/2013 |
| WO | 2014/145331 A1 | 9/2014 |
| WO | 2016/092329 A1 | 6/2016 |
| WO | 2016/107879 A2 | 7/2016 |
| WO | 2016/139475 A1 | 9/2016 |
| WO | 2017/221012 A1 | 12/2017 |
| WO | 2018/005591 A1 | 1/2018 |
| WO | 2019/008393 A1 | 1/2019 |

OTHER PUBLICATIONS

De Gasparo et al., International union of pharmacology. XXIII. The angiotensin II receptors. Pharmacol Rev. Sep. 2000;52(3):415-72.
Hallberg et al., Small-molecule AT2 receptor agonists. Med Res Rev. Mar. 2018;38(2):602-624.
Isaksson. Ligands of the Angiotensin II Type 2 Receptor. Exploring structure and function of the AT2R ligand C38. Digital Comprehensive Summaries of Uppsala Dissertations from the Faculty of Pharmacy 269. 74 pp. Uppsala: Acta Universitatis Upsaliensis. 2019.
King et al., Idiopathic pulmonary fibrosis. Lancet. Dec. 3, 2011;378(9807):1949-61.
Ley et al., Clinical course and prediction of survival in idiopathic pulmonary fibrosis. Am J Respir Crit Care Med. Feb. 15, 2011;183(4):431-40.
Mahalingam et al., Selective angiotensin II AT(2) receptor agonists with reduced CYP 450 inhibition. Bioorg Med Chem. Jun. 15, 2010;18(12):4570-90.
Murugaiah et al., From the first selective non-peptide AT(2) receptor agonist to structurally related antagonists. J Med Chem. Mar. 8, 2012;55(5):2265-78.
Noble et al., Pulmonary fibrosis: patterns and perpetrators. J Clin Invest. Aug. 2012;122(8):2756-62.

(Continued)

*Primary Examiner* — Golam M Shameem
(74) *Attorney, Agent, or Firm* — McCarter & English, LLP; Steven G. Davis; Michael J. DeGrazia

(57) ABSTRACT

There is provided herein a compound of formula I, wherein $R^1$, $R^2$, $R^3$, $Y^1$, $Y^2$, $Y^3$, $Y^4$, $R^4$, $R^5$ and $R^6$ are as defined herein, which compounds are useful in the treatment of autoimmune and/or fibrotic diseases, including interstitial lung diseases, such as idiopathic pulmonary fibrosis and sarcoidosis.

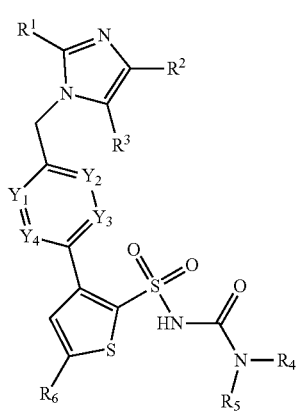

18 Claims, No Drawings

(56) References Cited

OTHER PUBLICATIONS

Rafii et al., A review of current and novel therapies for idiopathic pulmonary fibrosis. J Thorac Dis. Feb. 2013;5(1):48-73.

Wallinder. Design, Synthesis and Biological Evaluation of Selective Nonpeptide AT2 Receptor Agonists and Antagonists. Digital Comprehensive Summaries of Uppsala Dissertations from the Faculty of Pharmacy 78. 96pp. Acta Universitatis Upsaliensis.

Wan et al., Design, synthesis, and biological evaluation of the first selective nonpeptide AT2 receptor agonist. J Med Chem. Nov. 18, 2004;47(24):5995-6008.

Wannberg et al., A convenient transesterification method for synthesis of AT2 receptor ligands with improved stability in human liver microsomes. Bioorg Med Chem Lett. Feb. 1, 2018;28(3):519-522.

Wu et al., Selective angiotensin II AT2 receptor agonists: arylbenzylimidazole structure-activity relationships. J Med Chem. Nov. 30, 2006;49(24):7160-8.

International Search Report and Written Opinion for Application No. PCT/GB2020/052261, dated Nov. 26, 2020, 10 pages.

Pandey et al., AT2 receptor agonist Compound 21: A silver lining for diabetic nephropathy. Eur J Pharmacol. Nov. 15, 2017;815:251-257. Pre-publication edition.

\* cited by examiner

COMPOUNDS

CROSS-REFERENCE TO RELATED APPLICATIONS

This application is a U.S. national stage filing, under 35 U.S.C. § 371 (c), of International Application No. PCT/GB2020/052261, filed on Sep. 18, 2020, which claims priority to United Kingdom Patent Application No. 1913603.5, filed on Sep. 20, 2019.

FIELD OF THE INVENTION

This invention relates to novel pharmaceutically-useful compounds, in particular compounds that are angiotensin II (Ang II) agonists, more particularly agonists of the Ang II type 2 (AT2) receptor, and especially agonists that bind selectively to that receptor. The invention further relates to the use of such compounds as medicaments, to pharmaceutical compositions containing them, and to synthetic routes to their production.

BACKGROUND OF THE INVENTION

Renin, a protease, cleaves its only known substrate (angiotensinogen) to form angiotensin I (Ang I), which in turn serves as substrate to angiotensin converting enzyme (ACE) to form Angiotensin II (Ang II). The endogenous hormone Ang II is a linear octapeptide ($Asp^1$-$Arg^2$-$Val^3$-Tyro-$Ile^5$-$His^6$-$Pro^7$-$Phe^8$), and is an active component of the renin angiotensin system (RAS). The angiotensin II type 1 (AT1) receptor is expressed in most organs, and is believed to be responsible for the majority of the pathological effects of Ang II.

Several studies in adult individuals appear to demonstrate that, in the modulation of the response following Ang II receptor stimulation, activation of the AT2 receptor has opposing effects to those mediated by the AT1 receptor. The AT2 receptor has also been shown to be involved in apoptosis and inhibition of cell proliferation (de Gasparo M et al., *Pharmacol. Rev.* (2000); 52, 415-472). More recently, AT2 receptor agonists have been shown to be of potential utility in the treatment and/or prophylaxis of disorders of the alimentary tract, such as dyspepsia and irritable bowel syndrome, as well as multiple organ failure (see international patent application WO 99/43339). The expected pharmacological effects of agonism of the AT2 receptor are described in general in de Gasparo M et al., vide supra.

The stimulating effects of Ang II on vascular tone, cell growth, inflammation and extracellular matrix synthesis are mainly coupled to the AT1 receptor in any organ, whereas the function of the AT2 receptor seems to be more prevalent in damaged tissue and exerts reparative properties and properties opposing the AT1 receptor. For example, the AT2 receptor has been shown to be of importance in relation to reduction of myocyte hypertrophy and fibrosis.

Interstitial lung diseases (ILDs) are a group of lung diseases that affect the interstitium, characterised by tissue around alveoli becoming scarred and/or thickened, and so inhibiting the respiratory process.

ILDs are distinct from obstructive airway diseases (e.g. chronic obstructive airway disease (COPD) and asthma), which are typically characterized by narrowing (obstruction) of bronchi and/or bronchioles. ILDs may be caused by injury to the lungs, which triggers an abnormal healing response but, in some cases, these diseases have no known cause. ILDs can be triggered by chemicals (silicosis, asbestosis, certain drugs), infection (e.g. pneumonia) or other diseases (e.g. rheumatoid arthritis, systemic sclerosis, myositis or systemic lupus erythematosus).

The most common ILDs are idiopathic pulmonary fibrosis (IPF) and sarcoidosis, both of which are characterised by chronic inflammation and reduced lung function.

Sarcoidosis is a disease of unknown cause that is characterised by collections of inflammatory cells that form lumps (granulomas), often beginning in the lungs (as well as the skin and/or lymph nodes, although any organ can be affected). When sarcoidosis affects the lungs, symptoms include coughing, wheezing, shortness of breath, and/or chest pain.

Treatments for sarcoidosis are patient-specific. In most cases, symptomatic treatment with non-steroidal anti-inflammatory drugs (NSAIDs) is possible, but for those presenting lung symptoms, glucocorticoids (e.g. prednisone or prednisolone), antimetabolites and/or monoclonal anti-tumor necrosis factor antibodies are often employed.

IPF is a lung-disease of unknown cause that affects about 5 million people globally. It has no curative treatment options except, in rare cases, lung transplantation, resulting in a chronic, irreversible, progressive deterioration in lung function and, in most cases, leading to death within 2-5 years (median survival 2.5 to 3.5 years). While the overall prognosis is poor in IPF, it is difficult to predict the rate of progression in individual patients. Risk factors for IPF include age, male gender, genetic predisposition and history of cigarette smoking. The annual incidence is between 5-16 per 100,000 individuals, with a prevalence of 13-20 cases per 100,000 people, increasing dramatically with age (King Jr T E et al., *Lancet* (2011); 378, 1949-1961; Noble P W et al., *J. Clin. Invest.* (2012); 122, 2756-2762). IPF is limited to the lungs and is recalcitrant to therapies that targets the immune system which distinguishes it from pulmonary fibrosis associated with systemic diseases.

Patients with IPF usually seek medical assistance due to chronic and progressive exertional dyspnea and cough. Imaging of the lung classically reveals traction bronchiectasis, thickened interlobar septae and subpleural honeycombing. When all three manifestations are present and there is no evidence of a systemic connective tissue disease or environmental exposure, a diagnosis of IPF is very likely. A definite diagnosis is usually made by lung biopsy and requires a multidisciplinary team of expertise including pulmonologists, radiologists and pathologists experienced in interstitial lung diseases.

IPF demonstrates different phenotypes with different prognosis, defined as mild, moderate and severe. Mild cases follow a stable or slow progressive path with patients sometimes taking several years to seek medical advice. Accelerated IPF has a much more rapid progression with shortened survival, affecting a sub-group of patients, usually male cigarette smokers. Acute exacerbations of IPF are defined as a rapid worsening of the disease, and patients in this sub-population have very poor outcomes with a high mortality rate in the short run. The cause of IPF is unknown but it appears to be a disorder likely arising from an interplay of environmental and genetic factors resulting in fibroblast driven unrelenting tissue remodeling rather than normal repair; a pathogenesis primarily fibrosis driven rather than inflammatory driven. A growing body of evidence suggests that the disease is initiated through alveolar epithelial cell microinjuries and apoptosis, activating neighboring epithelial cells and attracting stem or progenitor cells that produce the factors responsible for the expansion of the fibroblast and myofibroblast populations in a tumor like way. The fibroblastic foci secrete exaggerated amounts of extracellular matrix that destroys the lung parenchyma and ultimately leads to loss of lung function.

The mean annual rate of decline in lung function (vital capacity) is within a range of 0.13-0.21 litres. Symptoms precede diagnosis by 1-2 years and radiographic signs may precede symptoms (Ley B et al., *Am. J. Respir. Crit. Care Med.* (2011); 183, 431-440).

Numerous treatment approaches have been tested in preclinical models and clinical trials such as anti-inflammatory, immune-modulatory, cytotoxic, general anti-fibrotic, antioxidant, anti-coagulant, anti-chemochine, anti-angiogenic drugs as well as RAS-blockers, endothelin antagonists, and sildenafil basically been shown to provide limited or no benefits (Rafii R et al., *J. Thorac. Dis.* (2013); 5, 48-73).

Current treatment of IPF includes oxygen supplementation. Medications that are used include pirfenidone or nintedanib, but only with limited success in slowing the progression of the disease. Further, both of these drugs commonly cause (predominantly gastrointestinal) side-effects.

There are drawbacks associated with all of the aforementioned ILD (and IPF) drug treatments and there is a real clinical need for safer and/or more effective treatments.

To restore the alveolar epithelium is very desirable as a therapeutic effect in IPF, and therefore stem cell therapy has also been tested. Some preclinical studies have shown promise in the use of pluripotent stem cells that can differentiate into lung epithelial and endothelial cells, thereby repairing lung injury and fibrosis.

Currently, a lung transplant is the only intervention that substantially improves survival in IPF patients. However, complications such as infections and transplant rejection are not uncommon.

The development of new treatment strategies for IPF is therefore important. Thus, the fundamental challenge for the future is to develop appropriate therapeutic approaches that will reverse or stop the progression of the disease.

US patent application US 2004/0167176 describes the preparation of tricyclic heterocycles useful as Ang II receptor agonists.

Selective AT2 receptor agonists with reduced CYP 450 inhibition are described in Mahalingam et al., *Bioorg. Med. Chem.* (2010); 18, 4570-4590.

Transesterification methods for synthesis of AT2 receptor ligands with improved stability in human liver microsomes are described in Wannberg et al., *Bioorg. Med. Chem. Lett.* (2018); 28, 519-522.

In particular, international patent application WO 2002/096883 describes the preparation of imidazolyl, triazolyl, and tetrazolyl thiophene sulfonamides and derivatives as Ang II receptor agonists. Of the compounds described in that document (as Example 1) is the compound C21 (N-butyloxycarbonyl-3-(4-imidazol-1-ylmethylphenyl)-5-isobutyl-thiophene-2-sulfon-amide). C21 was selected for clinical development from a group of about 20 related analogues as a selective AT2 receptor agonist. It is now in clinical development for treatment of AT2 receptor related disorders, including IPF (see, for example, international patent application WO 2016/139475).

C21 has also been indicated to be of potential use in the treatment of inter alia, stroke, spinal cord injury, sickle cell disease, muscular dystrophy, cancer treatment-related cardiotoxicity, peripheral neuropathy and systemic sclerosis (see, for example, international patent applications WO 2004/046141, WO 2016/092329, WO 2016/107879, WO 2016/139475, WO 2017/221012, WO 2019/008393, and US patent application US 2012/035232).

It has been found during development that C21 has the disadvantage that it is both, a potent inhibitor of several Cytochrome P450 enzymes (CYPs), especially CYP 2C9 and CYP 3A4, potentially affecting the metabolism of other drugs, and also rapidly hydrolysed to an inactive sulfonamide metabolite. It is thus a fundamental challenge to develop potent and selective AT2 agonists that are stable metabolically and/or exhibit less inhibition of CYP enzymes.

We have found, surprisingly, that certain chemically-modified compounds as defined hereinafter are not only selective AT2 receptor agonists but are also more potent, have a significantly improved stability to metabolic hydrolysis and/or exhibit less inhibition of CYP enzymes, compared to C21.

DESCRIPTION OF THE INVENTION

In a first aspect of the invention, there is provided a compound of formula I, wherein:
$R^1$ represents $C_{1-6}$ alkyl, optionally substituted by one or more halogen atoms;
$R^2$ and $R^3$ independently represent H or $C_{1-6}$ alkyl, optionally substituted by one or more halogen atoms;
$Y^1$, $Y^2$, $Y^3$ and $Y^4$ independently represent —CH—, —CF— or —N—;
$R^4$ represents $C_{1-7}$ alkyl, $C_{1-6}$ alkoxy, $C_{1-6}$ alkoxy-$C_{1-6}$ alkyl, each of which are optionally substituted with one or more halogen atoms, or
$R^4$ represents aryl, $C_{1-6}$ alkylaryl, $C_{1-3}$ alkenylaryl, heteroaryl, $C_{1-6}$ alkylheteroaryl or $C_{1-3}$ alkenylheteroaryl, each of which are optionally substituted by one or more substituents selected from halogen, $CF_3$, $CF_3O$, $C_{1-6}$ alkyl, and $C_{1-6}$ alkoxy;
$R^5$ represents H or $C_{1-6}$ alkyl, optionally substituted by one or more halogen atoms; and
$R^6$ represents $C_{1-6}$ alkyl, $C_{1-6}$ alkoxy, $C_{1-6}$ alkoxy-$C_{1-6}$ alkyl, each of which are optionally substituted by one or more halogen atoms,
or a pharmaceutically-acceptable salt thereof,
which compounds and salts are referred to together hereinafter as "the compounds of the invention".

Compounds of the invention that may be mentioned include those in which, when $R^4$ represents a $C_{1-7}$ alkyl group, the alkyl is a $C_{1-6}$ alkyl group.

For purposes of interpreting this specification, the following definitions will apply and whenever appropriate, terms used in the singular will also include the plural and vice versa.

Compounds are named according to IUPAC nomenclature generated by the program Chemdoodle 8.1.0.

For the avoidance of doubt, the skilled person will understand that references herein to compounds of particular aspects of the invention (such as any aspect of the invention referring to compounds of formula I as defined hereinbefore) will include references to all embodiments and particular features thereof, which embodiments and particular features may be taken in combination to form further embodiments and features of the invention.

Unless indicated otherwise, all technical and scientific terms used herein will have their common meaning as understood by one of ordinary skill in the art to which this invention pertains.

Pharmaceutically acceptable salts include acid addition salts and base addition salts. Such salts may be formed by conventional means, for example by reaction of a free acid or a free base form of a compound of the invention with one or more equivalents of an appropriate acid or base, optionally in a solvent, or in a medium in which the salt is insoluble, followed by removal of said solvent, or said medium, using standard techniques (e.g. in vacuo, by freeze-drying or by filtration). Salts may also be prepared using techniques known to those skilled in the art, such as by exchanging a counter-ion of a compound of the invention in the form of a salt with another counter-ion, for example using a suitable ion exchange resin.

Particular acid addition salts that may be mentioned include carboxylate salts such as formate, acetate, trifluoroacetate, benzoate, oxalate, fumarate, maleate and the like, sulfonate salts such as methanesulfonate, ethanesulfonate, toluenesulfonate and the like, halide salts such as hydrochloride, hydrobromide and the like, sulfate and phosphate salts such as sulfate or phosphate and the like.

Particular base addition salts that may be mentioned include salts formed with alkali metals (such as Li, Na and K salts), alkaline earth metals (such as Mg and Ca salts), or other metals (such as Al and Zn salts) amine bases (such as ammonia, ethylenediamine, ethanolamine, diethanolamine, triethanolamine, tromethamine. More particularly, base addition salts that may be mentioned include Mg, Ca and, most particularly, K and Na salts.

Compounds of the invention may exist as solids, and thus the scope of the invention includes all amorphous, crystalline and part crystalline forms thereof, and may also exist as oils. Where compounds of the invention exist in crystalline and part crystalline forms, such forms may include solvates, which are included in the scope of the invention.

Compounds of the invention may also exist in solution (i.e. in solution in a suitable solvent). For example, compounds of the invention may exist in aqueous solution, in which case compounds of the invention may exist in the form of hydrates.

Compounds of the invention may contain double bonds and, unless otherwise indicated, may thus exist as E (entgegen) and Z (zusammen) geometric isomers about each individual double bond. Unless otherwise specified, all such isomers and mixtures thereof are included within the scope of the invention.

Compounds of the invention may also exhibit tautomerism. All tautomeric forms and mixtures thereof are included within the scope of the invention (particularly those of sufficient stability to allow for isolation thereof).

Compounds of the invention may also contain one or more asymmetric carbon atoms and may therefore exhibit optical and/or diastereoisomerism (i.e. existing in enantiomeric or diastereomeric forms). Diastereoisomers may be separated using conventional techniques, e.g. chromatography or fractional crystallisation. The various stereoisomers (i.e. enantiomers) may be isolated by separation of a racemic or other mixture of the compounds using conventional, e.g. fractional crystallisation or HPLC, techniques. Alternatively the desired enantiomer or diastereoisomer may be obtained from appropriate optically active starting materials under conditions which will not cause racemisation or epimerisation (i.e. a 'chiral pool' method), by reaction of the appropriate starting material with a 'chiral auxiliary' which can subsequently be removed at a suitable stage, by derivatisation (i.e. a resolution, including a dynamic resolution; for example, with a homochiral acid followed by separation of the diastereomeric derivatives by conventional means such as chromatography), or by reaction with an appropriate chiral reagent or chiral catalyst, all of which methods and processes may be performed under conditions known to the skilled person. Unless otherwise specified, all stereoisomers and mixtures thereof are included within the scope of the invention.

As used herein, the term "halogen", when used herein, includes fluorine, chlorine, bromine and iodine.

Unless otherwise specified, $C_{1-7}$ alkyl groups (e.g. $C_{1-6}$ alkyl groups or $C_{1-3}$ alkyl groups), and the alkyl parts of $C_{1-6}$ alkoxy, $C_{1-6}$ alkoxy-$C_{1-6}$ alkyl, $C_{1-6}$ alkylaryl, $C_{1-6}$ alkylheteroaryl groups (where, in all cases, 6 is the upper limit of the range), defined herein may be straight-chain or, when there is a sufficient number (i.e. a minimum of two or three, as appropriate) of carbon atoms, be branched-chain, and/or cyclic (so forming a $C_{3-7}$ cycloalkyl group). When there is a sufficient number (i.e. a minimum of four) of carbon atoms, such groups may also be part-cyclic (so forming a $C_{4-7}$ partial cycloalkyl group). For example, cycloalkyl groups that may be mentioned include cyclopropyl, cyclobutyl, cyclopentyl and cyclohexyl. Similarly, part-cyclic alkyl groups (which may also be referred to as "part-cycloalkyl" groups) that may be mentioned include cyclopropylmethyl or cyclohexylmethyl. When there is a sufficient number of carbon atoms, such groups may also be multicyclic (e.g. bicyclic or tricyclic) and/or spirocyclic.

$C_{3-6}$ alkyl groups and $C_{3-6}$ alkoxy groups may be unsaturated and thus incorporate a double bond or triple bond.

Particular alkyl groups that may be mentioned include straight chain (i.e. not branched and/or cyclic) alkyl groups. For example, $C_{1-6}$ alkyl groups, and the alkyl parts of $C_{1-6}$ alkoxy groups, include but are not limited to n-butyl, sec-butyl, isobutyl, tert-butyl; propyl, such as n-propyl, 2-methylpropyl or isopropyl; ethyl; and methyl.

For the avoidance of any doubt, the point of attachment of the $C_{1-6}$ alkyl groups, and the alkyl parts of $C_{1-6}$ alkoxy-$C_{1-6}$ alkyl, $C_{1-6}$ alkylaryl, $C_{1-6}$ alkylheteroaryl groups, is via the alkyl part of such groups.

For the avoidance of doubt, alkoxy groups are attached to the rest of the molecule via the oxygen atom in that group and alkoxyalkyl groups are attached to the rest of the molecule via the alkyl part of that group.

Unless otherwise specified, alkoxy refers to an O-alkyl group in which the term "alkyl" has the meaning(s) given above.

As used herein, references to heteroatoms will take their normal meaning as understood by one skilled in the art. Particular heteroatoms that may be mentioned include phosphorus, selenium, silicon, boron, oxygen, nitrogen and sulfur (e.g. oxygen, nitrogen and sulfur, such as oxygen and nitrogen).

As may be used herein, references to "heteroaryl" (which may also be referred to as heteroaromatic) rings or groups may refer to heteroaromatic groups containing one or more heteroatoms (such as one or more heteroatoms selected from oxygen, nitrogen and/or sulfur). Such heteroaryl groups may comprise one, two, or three rings, of which at least one is aromatic (which aromatic ring(s) may or may not contain the one or more heteroatom). Substituents on heteroaryl/heteroaromatic groups may, where appropriate, be located on any suitable atom in the ring system, including a heteroatom (e.g. on a suitable N atom).

The point of attachment of heteroaryl/heteroaromatic groups may be via any atom in the ring system including (where appropriate) a heteroatom. Bicyclic heteroaryl/heteroaromatic groups may comprise a benzene ring fused to one or more further aromatic or non-aromatic heterocyclic rings, in which instances, the point of attachment of the polycyclic heteroaryl/heteroaromatic group may be via any ring including the benzene ring or the heteroaryl/heteroaromatic or heterocyclyl ring.

For the avoidance of doubt, the skilled person will understand that heteroaryl groups that may form part of compounds of the invention are those that are chemically obtainable, as known to those skilled in the art. Various heteroaryl groups will be well-known to those skilled in the art, such as pyridinyl, pyrrolyl, furanyl, thiophenyl, oxadiazolyl, thiadiazolyl, thiazolyl, oxazolyl, pyrazolyl, triazolyl, tetrazolyl, isoxazolyl, isothiazolyl, imidazolyl, imidazopyrimidinyl, imidazothiazolyl, thienothiophenyl, pyrimidinyl, furopyridinyl, indolyl, azaindolyl, pyrazinyl, pyrazolopyrimidinyl, indazolyl, pyrimidinyl, quinolinyl, isoquinolinyl, quinazolinyl, benzofuranyl, benzothiophenyl, benzoimidazolyl, benzoxazolyl, benzothiazolyl, benzotriazolyl and purinyl.

For the avoidance of doubt, the oxides of heteroaryl/heteroaromatic groups are also embraced within the scope of the invention (e.g. the N-oxide).

As stated above, heteroaryl includes polycyclic (e.g. bicyclic) groups in which one ring is aromatic (and the other may or may not be aromatic). Hence, other heteroaryl groups that may be mentioned include groups such as benzo[1,3]dioxolyl, benzo[1,4]dioxinyl, dihydrobenzo[d]isothiazole, 3,4-dihydrobenz[1,4]oxazinyl, dihydrobenzothiophenyl, indolinyl, 5H,6H,7H-pyrrolo[1,2-b]pyrimidinyl, 1,2,3,4-tetrahydroquinolinyl, thiochromanyl and the like.

Aromatic groups may be depicted as cyclic groups comprising therein a suitable number of double bonds to allow for aromaticity.

As may be used herein, the term aryl may refer to $C_{6-14}$ (e.g. $C_{6-10}$) aromatic groups. Such groups may be monocyclic or bicyclic and, when bicyclic, be either wholly or partly aromatic. $C_{6-10}$ aryl groups that may be mentioned include phenyl, naphthyl, 1,2,3,4-tetrahydronaphthyl, indanyl, and the like (e.g. phenyl, naphthyl, and the like).

The skilled person will understand that aryl groups that may form part of compounds of the invention are those that are chemically obtainable, as known to those skilled in the art.

For the avoidance of doubt, the point of attachment of substituents on aryl groups may be via any suitable carbon atom of the ring system.

The present invention also embraces isotopically-labelled compounds of the present invention which are identical to those recited herein, but for the fact that one or more atoms are replaced by an atom having an atomic mass or mass number different from the atomic mass or mass number usually found in nature (or the most abundant one found in nature). All isotopes of any particular atom or element as specified herein are contemplated within the scope of the compounds of the invention. Hence, the compounds of the invention also include deuterated compounds, i.e. compounds of the invention in which one or more hydrogen atoms are replaced by the hydrogen isotope deuterium.

In cases in which the identity of two or more substituents in a compound of the invention may be the same, the actual identities of the respective substituents are not in any way interdependent. For example, in the situation in which two or more halo groups are present, those groups may be the same or different (e.g. two chloro groups or a fluoro and a chloro group). Similarly, where two or more alkyl groups are present, the groups in question may be the same or different in terms of their number of carbon atoms and/or whether they are linear, branched, unsaturated or otherwise.

Further, when it is specified that a substituent is itself optionally substituted by one or more substituents (e.g. phenyl optionally substituted by one or more groups independently selected from halo), these substituents where possible may be positioned on the same or different atoms. Such optional substituents may be present in any suitable number thereof (e.g. the relevant group may be substituted with one or more such substituents, such as one such substituent).

Where groups are referred to herein as being optionally substituted it is specifically contemplated that such optional substituents may be not present (i.e. references to such optional substituents may be removed), in which case the optionally substituted group may be referred to as being unsubstituted.

Unless otherwise specified, substituents (whether optional or otherwise) may be located at any point on a group to which they may be attached. In this respect, alkyl and alkoxy groups (for example) that may be substituted by one or more substituents may also be terminated by such substituents (by which we mean located at the terminus of an e.g. alkyl or alkoxy chain).

For the avoidance of doubt, in cases in which the identity of two or more substituents in a compound of formula I may be the same, the actual identities of the respective substituents are not in any way interdependent. For example, in the situation in which $R^2$ and $R^3$ are both $C_{1-6}$ alkyl, the $C_{1-6}$ alkyl groups in question may be the same or different.

The skilled person will appreciate that compounds of the invention that are the subject of this invention include those that are obtainable, i.e. those that may be prepared in a stable form. That is, compounds of the invention include those that are sufficiently robust to survive isolation, e.g. from a reaction mixture, to a useful degree of purity.

Preferred compounds of the invention include those in which:
$R^1$ represents a $C_{1-4}$ alkyl group (such as methyl, ethyl, propyl (e.g. n-propyl) or butyl (e.g. n-butyl)), optionally substituted by up to three halogen atoms (e.g. $CH_2CHClCH_2CH_2F$ or $CH_2CF_3$);
$R^2$ and $R^3$ independently represent H or a $C_{1-4}$ alkyl group (such as methyl, ethyl, propyl (e.g. n-propyl) or butyl (e.g. n-butyl)), optionally substituted by up to three halogen atoms (e.g. $CH_2CHClCH_2CH_2F$ or $CH_2CF_3$);
$R^4$ represents a $C_{1-4}$ alkyl group (such as methyl, ethyl, propyl (e.g. n-propyl) or butyl (e.g. n-butyl)), optionally substituted by up to three halogen atoms; a $C_{1-3}$ alkoxy-$C_{1-3}$ alkyl group, optionally substituted, or more preferably terminated, by up to three halogen atoms; aryl, optionally substituted by one or more halogen atoms (e.g. phenyl, fluorophenyl or trifluorophenyl); $C_{1-3}$ alkylaryl; or $C_{1-3}$ alkylheteroaryl;

$R^5$ represents H or a $C_{1-4}$ alkyl group (such as methyl, ethyl, propyl (e.g. n-propyl) or butyl (e.g. n-butyl));

$R^6$ represents a $C_{1-4}$ alkyl group, optionally substituted or more preferably terminated by up to three fluorine atoms;

$Y^1$ represents —CH—, —CF— or —N—;

$Y^2$ represents —N— or, more preferably, —CH—, —CF—;

$Y^3$ represents —CH—;

$Y^4$ represents —CH— or —N—.

More preferred compounds of the invention include those in which:

$R^1$ represents a $C_{1-3}$ alkyl group (such as methyl, ethyl, propyl (e.g. n-propyl)), optionally substituted by up to three fluorine atoms (e.g. $CH_2CF_3$ or —$CH_2CH_2CH_2F$);

$R^2$ and $R^3$ independently represent methyl or ethyl or, more preferably, H;

$R^4$ represents a $C_{1-4}$ alkyl group (such as methyl, ethyl, propyl (e.g. n-propyl) or butyl (e.g. n-butyl)), optionally substituted, or more preferably terminated, by up to three fluorine atoms; or a $C_{1-2}$ alkoxy-$C_{1-3}$ alkyl group, optionally substituted, or more preferably terminated, by up to three fluorine atoms; phenyl; $C_{1-2}$ alkylaryl (e.g. $C_{1-2}$ alkylphenyl); or $C_{1-2}$ alkylheteroaryl (e.g. $C_{1-2}$ alkylthiophenyl);

$R^6$ represents butyl, more preferably isobutyl, optionally substituted or more preferably terminated by up to three fluorine atoms.

Particularly preferred compounds of the invention include those in which:

$R^1$ represents ethyl or, more preferably, methyl;

$R^2$ represents methyl or, more preferably, H;

$R^3$ represents H;

$R^4$ represents an ethyl, propyl (e.g. n-propyl) or butyl (e.g. n-butyl) group, optionally substituted, or more preferably terminated, by up to three fluorine atoms; a $C_{1-2}$ alkoxy-$C_{1-2}$ alkylgroup, such as a methoxyethyl group, optionally substituted, or more preferably terminated, by up to three fluorine atoms; phenyl; benzyl; thiophen-2-ylmethyl; or pyridine-2-ylmethyl;

$R^5$ represents H;

$R^6$ represents butyl, more preferably isobutyl;

$Y^1$ represents —CF— or, more preferably, —CH—;

$Y^2$, $Y^3$ and $Y^4$ all represent —CH—.

Thus, particular preferred compounds of the invention that may be mentioned include 1-benzyl-3-(5-isobutyl-3-{p-[(2-methyl-1H-imidazol-1-yl)methyl]phenyl}-2 thienylsulfonyl)urea, 3-(5-isobutyl-3-{p-[(2-methyl-1H-imidazol-1-yl)methyl]phenyl}-2-thienylsulfonyl)-1-[(2-pyridyl)methyl]urea, 3-(5-isobutyl-3-{p-[(2-methyl-1H-imidazol-1-yl)methyl]phenyl}-2-thienylsulfonyl)-1-(3,3,3-trifluoropropyl)urea, 1-butyl-3-(5-isobutyl-3-{p-[(2-methyl-1H-imidazol-1-yl)methyl]phenyl}-2-thienylsulfonyl)urea, 3-(5-isobutyl-3-{p-[(2-methyl-1H-imidazol-1-yl)methyl]phenyl}-2-thienylsulfonyl)-1-(4,4,4-trifluorobutyl)urea, 1-benzyl-3-(3-{p-[(2-ethyl-1H-imidazol-1-yl)methyl]phenyl}-5-isobutyl-2-thienylsulfonyl)urea, 3-(3-{p-[(2-ethyl-1H-imidazol-1-yl)methyl]phenyl}-5-isobutyl-2-thienylsulfonyl)-1-(2-methoxyethyl)urea, 3-(3-{p-[(2,4-dimethyl-1H-imidazol-1-yl)methyl]phenyl}-5-isobutyl-2-thienylsulfonyl)-1-(3,3,3-trifluoropropyl)urea, and pharmaceutically-acceptable salts thereof.

Further preferred compounds of the invention that may be mentioned include 3-(3-{p-[(2-ethyl-1H-imidazol-1-yl)methyl]phenyl}-5-isobutyl-2-thienylsulfonyl)-1-[(2-pyridyl)methyl]urea, 1-benzyl-3-(3-{p-[(2,4-dimethyl-1H-imidazol-1-yl)methyl]phenyl}-5-isobutyl-2-thienylsulfonyl)urea, 3-(3-{p-[(2,4-dimethyl-1H-imidazol-1-yl)methyl]phenyl}-5-isobutyl-2-thienylsulfonyl)-1-[(2-pyridyl)methyl]urea, 1-benzyl-3-(3-{3-fluoro-4-[(2-methyl-1H-imidazol-1-yl)methyl]phenyl}-5-isobutyl-2-thienylsulfonyl)urea, 3-(3-{3-fluoro-4-[(2-methyl-1H-imidazol-1-yl)methyl]phenyl}-5-isobutyl-2-thienylsulfonyl)-1-[(2-pyridyl)methyl]urea, 3-(3-{3-fluoro-4-[(2-methyl-1H-imidazol-1-yl)methyl]phenyl}-5-isobutyl-2-thienylsulfonyl)-1-(3,3,3-trifluoropropyl)urea, 1-(3-{3-fluoro-4-[(2-methyl-1H-imidazol-1-yl)methyl]phenyl}-5-isobutyl-2-thienylsulfonyl)-3-[(1-methyl-1H-imidazol-2-yl)methyl]urea, 1-(3-{3-fluoro-4-[(2-methyl-1H-imidazol-1-yl)methyl]phenyl}-5-isobutyl-2-thienylsulfonyl)-3-[2-(1H-imidazol-4-yl)ethyl]urea, 3-(3-{3-fluoro-4-[(2-methyl-1H-imidazol-1-yl)methyl]phenyl}-5-isobutyl-2-thienylsulfonyl)-1-methyl-1-[(2-pyridyl)methyl]urea, 3-(3-{3-fluoro-4-[(2-methyl-1H-imidazol-1-yl)methyl]phenyl}-5-isobutyl-2-thienylsulfonyl)-1-(4,4,4-trifluorobutyl)urea, 3-(5-isobutyl-3-{5-[(2-methyl-1H-imidazol-1-yl)methyl]-2-pyridyl}-2-thienylsulfonyl)-1-(3,3,3-trifluoropropyl)urea, 3-(5-isobutyl-3-{2-[(2-methyl-1H-imidazol-1-yl)methyl]-5-pyrimidinyl}-2-thienylsulfonyl)-1-(2-methoxyethyl)urea, 3-(5-isobutyl-3-{2-[(2-methyl-1H-imidazol-1-yl)methyl]-5-pyrimidinyl}-2-thienylsulfonyl)-1-(3,3,3-trifluoropropyl)urea, 3-(5-isobutyl-3-{2-[(2-methyl-1H-innidazol-1-yl)methyl]-5-pyrimidinyl}-2-thienylsulfonyl)-1-[(2-pyridyl)methyl]urea, 1-[(3,5-difluorophenyl)methyl]-3-(5-isobutyl-3-{5-[(2-methyl-1H-imidazol-1-yl)methyl]-2-pyridyl}-2-thienylsulfonyl)urea, 3-(3-{3-fluoro-4-[(2-methyl-1H-innidazol-1-yl)methyl]phenyl}-5-isobutyl-2-thienylsulfonyl)-1-(2-methoxyethyl)urea, 3-(3-{3-fluoro-4-[(2-methyl-1H-innidazol-1-yl)methyl]phenyl}-5-isobutyl-2-thienylsulfonyl)-1-[1-(2-pyridyl)ethyl]urea, 3-(3-{2-fluoro-4-[(2-methyl-1H-innidazol-1-yl)methyl]phenyl}-5-isobutyl-2-thienylsulfonyl)-1-(3,3,3-trifluoropropyl)urea, 3-(3-{2-fluoro-4-[(2-methyl-1H-innidazol-1-yl)methyl]phenyl}-5-isobutyl-2-thienylsulfonyl)-1-(2,2,2-trifluoroethyl)urea, 1-(3-fluoropropyl)-3-(5-isobutyl-3-{p-[(2-methyl-1H-innidazol-1-yl)methyl]phenyl}-2-thienylsulfonyl)urea, 1-(3,3-difluoropropyl)-3-(5-isobutyl-3-{p-[(2-methyl-1H-imidazol-1-yl)methyl]phenyl}-2-thienylsulfonyl)urea, 1-[(3-{4-[(2-ethyl-1H-innidazol-1-yl)methyl]-3-fluorophenyl}-5-(2-methylpropyl)thiophen-2-yl)sulfonyl]-3-(3,3,3-trifluoropropyl)urea, 1-[(3-{4-[(2-ethyl-1H-innidazol-1-yl)methyl]-3-fluorophenyl}-5-(2-methylpropyl)thiophen-2-yl)sulfonyl]-3-(2-methoxyethyl)urea, 3-[(3-{4-[(2-ethyl-1H-innidazol-1-yl)methyl]-3-fluorophenyl}-5-(2-methylpropyl)thiophen-2-yl)sulfonyl]-1-[(4-fluorophenyl)methyl]urea, 1-[(3-{4-[(2-ethyl-1H-innidazol-1-yl)methyl]-3-fluorophenyl}-5-(2-methylpropyl)thiophen-2-yl)sulfonyl]-3-propylurea, 1-[(3,4-difluorophenyl)methyl]-3-[(3-{3-fluoro-4-[(2-methyl-1H-imidazol-1-yl)methyl]phenyl}-5-(2-methylpropyl)thiophen-2-yl)sulfonyl]urea, 1-[(3-{3-fluoro-4-[(2-methyl-1H-innidazol-1-yl)methyl]phenyl}-5-(2-methylpropyl)thiophen-2-yl)sulfonyl]-3-[(thiophen-2-yl)methyl]urea, 1-[(3-{3-fluoro-4-[(2-methyl-1H-innidazol-1-yl)methyl]phenyl}-5-(2-methylpropyl)thiophen-2-yl)sulfonyl]-3-propylurea, 1-[(3-{3-fluoro-4-[(2-methyl-1H-innidazol-1-yl)methyl]phenyl}-5-(2-methylpropyl)thiophen-2-yl)sulfonyl]-3-(3,3,3-trifluoropropyl)urea, 1-[(4-chloropyridin-2-yl)methyl]-3-[(3-{3-fluoro-4-[(2-methyl-1H-imidazol-1-yl)methyl]phenyl}-5-(2-methylpropyl)thiophen-2-yl)sulfonyl]urea, 1-[(3-{3-fluoro-4-[(2-methyl-1H-innidazol-1-yl)methyl]phenyl}-5-(2-methylpropyl)thiophen-2-yl)sulfonyl]-3-(2-methylpropyl)urea, 1-[(4,4-difluorocyclohexyl)methyl]-3-[(3-{3-fluoro-4-[(2-methyl-1H-imidazol-1-yl)methyl]phenyl}-5-(2-methylpropyl)thiophen-2-yl)sulfonyl]urea, 1-{[3-(3-fluoro-4{[2-(propan-2-yl)-1H-imidazol-1-yl]methyl}phenyl)-5-(2-methylpropyl)thiophen-2-yl]sulfonyl}-3-(3,3,3-trifluoropropyl)urea, 1-{[3-(3-fluoro-4{[2-(propan-2-yl)-1H-imidazol-1-yl]methyl}phenyl)-5-(2-methylpropyl)thiophen-2-yl]sulfonyl}-3-(4,4,4-trifluorobutyl)urea, 1-{[3-(3-fluoro-4{[2-(propan-2-yl)-1H-imidazol-1-yl]methyl}phenyl)-5-(2-methylpropyl)thiophen-2-yl]sulfonyl}-3-propylurea, 1-(3-{3-fluoro-4-[(2-methyl-1H-imidazol-1-yl)methyl]phenyl}-5-isobutyl-2-thienylsulfonyl)-3-propoxyurea, 3-(3-{3-fluoro-4-[(2-methyl-1H-imidazol-1-yl)methyl]phenyl}-5-(2,2,2-trifluoroethyl)-2-thienylsulfonyl)-1-(3,3,3-trifluoropropyl)urea, and 3-(3-{3,5-difluoro-4-[(2-methyl-1H-imidazol-1-yl)methyl]phenyl}-5-isobutyl-2-thienylsulfonyl)-1-(3,3,3-trifluoropropyl)urea, and pharmaceutically-acceptable salts thereof.

IUPAC names were generated from the program Chemdoodle 8.1.0.

More preferred compounds of the invention include the compounds of the examples described hereinafter.

Compounds of formula I may be made in accordance with techniques well known to those skilled in the art, for example as described hereinafter.

According to a further aspect of the invention there is provided a process for the preparation of a compound of formula I, which process comprises:

(i) Reaction of a compound of formula II,

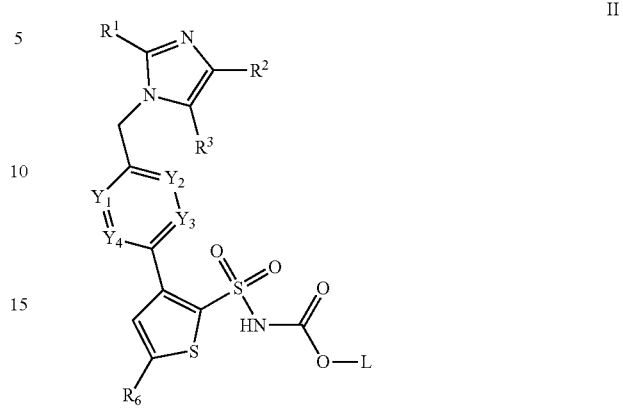

wherein $R^1$, $R^2$, $R^3$, $R^6$, $Y^1$, $Y^2$, $Y^3$ and $Y^4$ are as hereinbefore defined and L represents $C_{1-6}$ alkyl with a compound of formula III or a salt thereof,

NHR⁴R⁵    III wherein $R^4$ and $R^5$ are as hereinbefore defined, for example at around room temperature or above (e.g. up to 90-110° C.) in the presence of a suitable solvent such as toluene, acetonitrile or dioxane and/or a suitable base, such as triethylamine or 4-dimethylaminopyridine.

(ii) In the case of compounds of formula I in which $R^5$ represents H, reaction of a compound of formula IV,

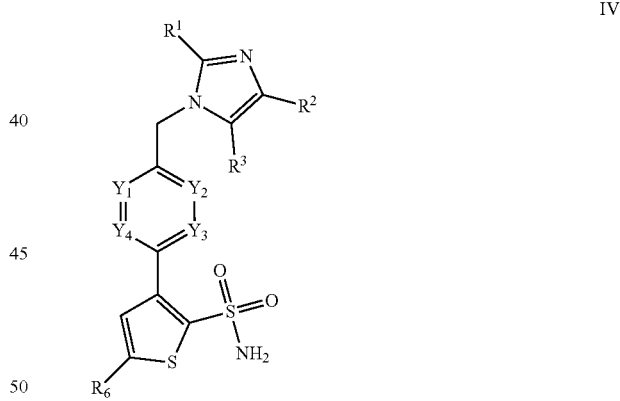

wherein $R^1$, $R^2$, $R^3$, $R^6$, $Y^1$, $Y^2$, $Y^3$ and $Y^4$ are as hereinbefore defined with a compound of formula V,

R⁴—N=C=O    V wherein $R^4$ is as hereinbefore defined, for example at around room temperature or above (e.g. up to 60-70° C.) optionally in the presence of a suitable base (e.g. pyrollidinopyridine, pyridine, triethylamine, tributylamine, trimethylamine, dimethylaminopyridine, di-isopropylamine, 1,8-diazabicyclo[5.4.0]undec-7-ene, or mixtures thereof) and an appropriate solvent (e.g. pyridine, dichloromethane, ethylacetate, tetrahydrofurane, dimethylformamide).

Compounds of formula II may be prepared by reaction of a compound of formula IV as hereinbefore defined with a compound of formula VI,

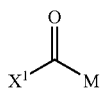

VI wherein $X^1$ represents a suitable leaving group, such as halo (e.g. chloro or bromo) and M represents —O—$C_{1-6}$ alkyl, for example at under, around, or above room temperature (e.g. 0° C., or up to 60-70° C.) in the presence of a suitable base (e.g. sodium hydrogen carbonate, pyrollidinopyridine, pyridine, triethylamine, tributylamine, trimethylamine, dimethylaminopyridine, di-isopropylamine, 1,8-diazabicyclo[5.4.0]undec-7-ene, or mixtures thereof) and an appropriate solvent (e.g. pyridine, dichloromethane, chloroform, tetrahydrofuran, dimethylformamide, or toluene).

Compounds of formula IV may be prepared by reaction of a compound of formula VII,

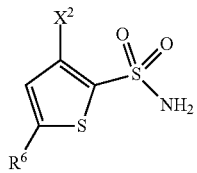

VII wherein $R^6$ is as hereinbefore defined, or a N-protected derivative thereof, wherein $X^2$ represents a suitable cross-coupling group, with a compound of formula VIII,

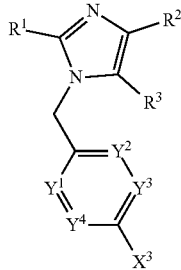

VIII wherein $X^3$ represents a suitable cross-coupling group. The above coupling reaction is preferably a Suzuki reaction, and therefore may be performed under standard Suzuki conditions, which means that one of $X^2$ and $X^3$ represents either one of the suitable Suzuki cross-coupling groups (or 'partners'), i.e. boronic acid (—B(OH)$_2$) and halo groups, such as iodo or bromo and the other represents the other group. $R^1$, $R^2$, $R^3$, $Y^1$, $Y^2$, $Y^3$, and $Y^4$ are as hereinbefore defined. The standard Suzuki conditions may be applied in this reaction, which includes, for example, the presence of an appropriate coupling catalyst system (e.g. a palladium catalyst, such as [1,1'Bis(diphenylphosphino)ferrocene]-dichloropalladium (II), [1,1'-bis(diphenylphosphino)ferrocene]-dichloropalladium(II) complex with dichloromethane, Pd(PPh$_3$)$_4$ or Pd(OAc)$_2$/ligand (wherein the ligand may be, for example, PPh$_3$, P(o-Tol)$_3$ or 1,1'-bis(diphenylphosphino)ferrocene)) and a suitable base (e.g. sodium hydroxide, sodium carbonate, potassium carbonate, caesium carbonate, triethylamine or di-iso-propylamine), as well as a suitable solvent system (e.g. toluene, ethanol, n-butanol, dimethoxymethane, dimethylformamide, ethylene glycol dimethyl ether, water, dioxane or mixtures thereof). This reaction may be carried out at above room temperature (e.g. at the reflux temperature of the solvent system that is employed). If a protected version of a compound of formula VII is employed, this reaction may be followed by deprotection of the SO$_2$NH-group under standard conditions, for example as described hereinafter. The reaction of a compound of formula VII with a compound of formula VII may also be followed by reaction of the intermediate so formed with a suitable acid to form an acid addition salt or, more preferably, a N-protected version thereof. Suitable acid addition salts include fumarate, trifluoroacetate and oxalate salts.

Compounds of formula IV may alternatively be prepared by reaction of a compound of formula IX,

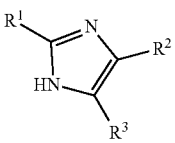

IX wherein $R^1$, $R^2$ and $R^3$ are as hereinbefore defined with a compound of formula X,

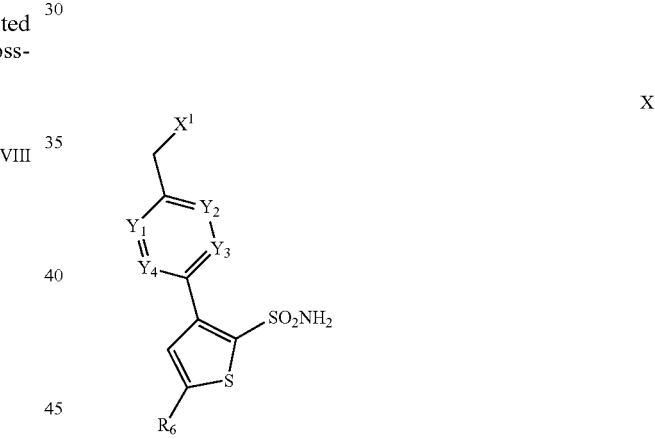

X wherein $R^6$, $X^1$, $Y^1$, $Y^2$, $Y^3$ and $Y^4$ are as hereinbefore defined ($X^1$, in particular, may represent bromo), or a N-protected derivative thereof, for example at around or below room temperature in the presence of a suitable base (e.g. pyridine) and an appropriate organic solvent (e.g. toluene). If a protected version of a compound of formula X is employed, this reaction may be followed by deprotection of the SO$_2$NH-group under standard conditions, for example as described hereinafter. Additionally, compounds of formula IV may be prepared in this way for example according, or analogously, to processes described in inter alia UK patent application GB 2281298.

Compounds of formula VIII may be prepared by standard techniques, for example by way of reaction of a compound of formula IX as hereinbefore defined with a compound of formula XI,

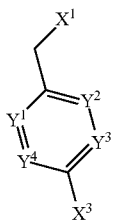

XI wherein $X^1$, $X^3$, $Y^1$, $Y^2$, $Y^3$ and $Y^4$ are as hereinbefore defined, for example under similar conditions to those described hereinbefore in respect of preparation of compounds of formula IV.

Compounds of formula X are known in the art. For example, they may be prepared according, or analogously, to processes described in inter alia U.S. Pat. No. 5,312,820, UK patent application GB 2281298, and/or international patent application WO 02/096883.

Compounds of formula VII are known in the art. For example, they may be prepared according, or analogously, to processes described in inter alia international patent application WO 02/096883.

Compounds of formulae III, V, VI, VIII, IX and XI are either commercially available, are known in the literature, or may be obtained either by analogy with the processes described herein, or by conventional synthetic procedures, in accordance with standard techniques, from readily-available starting materials using appropriate reagents and reaction conditions.

It will be appreciated by those skilled in the art that, in the processes described above and hereinafter, the functional groups of intermediate compounds may need to be protected by protecting groups.

Functional groups that it is desirable to protect include sulphonamido, amido, amino and aldehyde. Suitable protecting groups for sulphonamido, amido and amino include tert-butyloxycarbonyl, benzyloxycarbonyl, 2-trimethylsilylethoxycarbonyl (Teoc) or tert-butyl. Suitable protecting groups for aldehyde include alcohols, such as methanol or ethanol, and diols, such as 1,3-propanediol or, preferably, 1,2-ethanediol (so forming a cyclic acetal). The protection and deprotection of functional groups may take place before or after a reaction in the above-mentioned schemes.

Protecting groups may be applied and removed in accordance with techniques that are well-known to those skilled in the art and as described hereinafter. For example, protected compounds/intermediates described herein may be converted chemically to unprotected compounds using standard deprotection techniques. The type of chemistry involved will dictate the need, and type, of protecting groups as well as the sequence for accomplishing the synthesis. The use of protecting groups is fully described in "*Protective Groups in Organic Synthesis*", 3rd edition, T. W. Greene & P. G. M. Wutz, Wiley-Interscience (1999), the contents of which are incorporated herein by reference.

Medical and Pharmaceutical Uses

As described herein, the compounds of the invention, and therefore compositions and kits comprising the same, are useful because they possess pharmacological activity, and/or are metabolised in the body following oral or parental administration to form compounds that possess pharmacological activity.

Thus, according to a further aspect of the invention there is provided the compound of the invention, as hereinbefore defined, for use as a pharmaceutical (or for use in medicine).

In particular, compounds of the invention are agonists of Ang II receptors. Compounds of the invention are thus expected to be useful in those conditions in which endogenous production of Ang II is deficient and/or where an increase in the effect of Ang II is desired or required.

More particularly, compounds of the invention are agonists of the AT2 receptor, and, especially, are selective (vs. the AT1 receptor) agonists of that sub-receptor, for example as may be demonstrated in the tests described below.

AT2 receptor agonists include those that fully, and those that partially, activate the AT2 receptor. Compounds of the invention may thus bind selectively to, and exhibit agonist activity at, the AT2 receptor. By compounds that 'bind selectively' to the AT2 receptor, we include that the affinity ratio for the relevant compound (AT2:AT1) at a given concentration is at least 100:1, preferably at least 1000:1.

The compounds of the invention are further expected to be useful in those conditions where AT2 receptors are expressed and their stimulation is desired or required.

In this respect, compounds of the invention are indicated in the treatment of conditions characterised by vasoconstriction, fibrosis, increased cell growth and/or differentiation, increased cardiac contractility, increased cardiovascular hypertrophy, and/or increased fluid and electrolyte retention, as well as skin disorders and musculoskeletal disorders.

Compounds of the invention may also exhibit thromboxane receptor activity. In this respect, compounds of the invention may have an inhibitory effect on platelet activation and/or aggregation (and thus e.g. an antithrombotic effect), and/or may reduce vasoconstriction and/or bronchoconstriction in a therapeutic manner.

Compounds of the invention are further indicated in the treatment of stress-related disorders, and/or in the improvement of microcirculation and/or mucosa-protective mechanisms.

Thus, compounds of the invention are expected to be useful in the treatment of disorders, which may be characterised as indicated above, and which are of, for example, the gastrointestinal tract, the cardiovascular system, the respiratory tract, the kidneys, the eyes, the female reproductive (ovulation) system and the central nervous system (CNS).

Disorders of the gastrointestinal tract that may be mentioned include oesophagitis, Barrett's oesophagus, gastric ulcers, duodenal ulcers, dyspepsia (including non-ulcer dyspepsia), gastro-oesophageal reflux, irritable bowel syndrome (IBS), inflammatory bowel disease (IBD), pancreatitis, hepatic disorders (such as hepatitis), gall bladder disease, multiple organ failure (MOF) and sepsis. Other gastrointestinal disorders that may be mentioned include xerostomia, gastritis, gastroparesis, hyperacidity, disorders of the bilary tract, coelicia, Crohn's disease, ulcerative colitis, diarrhoea, constipation, colic, dysphagia, vomiting, nausea, indigestion and Sjögren's syndrome.

Disorders of the respiratory tract that may be mentioned include inflammatory disorders, such as asthma, obstructive lung diseases (such as chronic obstructive lung disease), pneumonitis, pulmonary hypertension, and adult respiratory distress syndrome.

Disorders of the kidneys that may be mentioned include renal failure, nephritis and renal hypertension.

Disorders of the eyes that may be mentioned include diabetic retinopathy, premature retinopathy and retinal microvascularisation.

Disorders of the female reproductive system that may be mentioned include ovulatory dysfunction.

Cardiovascular disorders that may be mentioned include hypertension, cardiac hypertrophy, cardiac failure (including heart failure with preserved ejection fraction), artherosclerosis, arterial thrombosis, venous thrombosis, endothelial dysfunction, endothelial lesions, post-balloon dilatation stenosis, angiogenesis, diabetic complications, microvascular dysfunction, angina, cardiac arrhythmias, claudicatio intermittens, preeclampsia, myocardial infarction, reinfarction, ischaemic lesions, erectile dysfunction and neointima proliferation.

Disorders of the CNS that may be mentioned include cognitive dysfunctions, dysfunctions of food intake (hunger/satiety) and thirst, stroke, cerebral bleeding, cerebral embolus and cerebral infarction, multiple sclerosis (MS), Alzheimer's disease and Parkinson's disease.

Compounds of the invention may also be useful in the modulation of growth metabolism and proliferation, for example in the treatment of ageing, hypertrophic disorders, prostate hyperplasia, autoimmune disorders (e.g. arthritis, such as rheumatoid arthritis, or systemic lupus erythematosus), psoriasis, obesity, neuronal regeneration, the healing of ulcers, inhibition of adipose tissue hyperplasia, stem cell differentiation and proliferation, fibrotic disorders, cancer (e.g. in, or of, the gastrointestinal tract (including the oesophagus or the stomach), the prostate, the breast, the liver, the kidneys, as well as lymphatic cancer, lung cancer, ovarian cancer, pancreatic cancer, hematologic malignacies, etc.), apoptosis, tumours (generally) and hypertrophy, diabetes, neuronal lesions and organ rejection.

Compounds of the invention are also useful in the treatment of stroke, spinal cord injury, sickle cell disease, muscular dystrophy, cancer treatment-related cardiotoxicity, peripheral neuropathy and, in particular, systemic sclerosis.

Compounds of the invention are particularly indicated in the treatment and/or prevention of ILDs, such as sarcoidosis or fibrosis, more specifically pulmonary fibrosis and particularly IPF, as well as conditions that may trigger ILDs, such as systemic sclerosis, rheumatoid arthritis, myositis or systemic lupus erythematosus, or are otherwise associated with ILDs, such as pulmonary hypertension and/or pulmonary arterial hypertension.

Compounds of the invention are particularly useful in the treatment of pulmonary fibrosis, in particular IPF.

According to a further aspect of the present invention, there is provided a method of treatment of pulmonary fibrosis, and in particular IPF, which method comprises administration of a therapeutically effective amount of a compound of the invention to a person suffering from such a condition.

In the treatment of pulmonary fibrosis, including IPF, compounds of the invention may have an anti-fibrotic effect, with reduction of fibrosis and prevention of further deposition of extracellular matrix. Compounds of the invention may reduce lung scarring/wound healing and also have an anti-apoptotic effect, thereby preventing apoptosis of alveolar endothelial cells, being an initiating factor for the development of pulmonary fibrosis. Compounds of the invention may also have an anti-proliferative effect, thus reducing the cancer-like proliferation of fibroblasts and myofibroblasts in pulmonary fibrosis. Compounds of the invention may also improve vascular remodelling in pulmonary fibrosis, thereby reducing secondary pulmonary hypertension. Finally, compounds of the invention may demonstrate anti-inflammatory and anti-cytokine effects.

In addition, compounds of the invention may also be useful in the treatment or prevention of any fibrotic condition of one or more internal organs characterised by the excessive accumulation of fibrous connective tissue, and/or in the treatment or prevention of fibrogenesis and the morbidity and mortality that may be associated therewith. Such fibrosis may be associated with an acute inflammatory condition, such as acute respiratory distress syndrome (ARDS), severe acute respiratory syndrome (SARS), and multiple-organ inflammation, injury and/or failure, which may be caused by internal or external trauma (e.g. injury), or by an infection.

Such conditions may thus result from sepsis or septic shock caused by a viral, bacterial or fungal infection. Furthermore, acute lung injury, ARDS and, particularly, SARS may be caused by viruses, such as coronaviruses, include the novel SARS coronavirus 2 (SARS-CoV-2), which may result in internal tissue damage and/or dysfunction of relevant internal (e.g. mucosal) tissues, such as the respiratory epithelium. Such tissue damage may in turn give rise to severe fibrosis. For example, the SARS disease caused by the novel coronavirus SARS-CoV-2 (coronavirus disease 2019 or COVID-19) is known in many cases to result in fibrosis.

Compounds of the invention are particularly useful in the treatment of a disease or condition in which activation of AT2 receptors is desired or required but in which inhibition of one or more CYP enzymes is not desired.

In an alternative embodiment of the invention, there is provided the use of a compound of formula I, or a pharmaceutically acceptable salt thereof, in the manufacture of a medicament for use in the treatment of a disease or condition in which activation of AT2 receptors is desired or required but in which inhibition of CYP enzymes is not desired.

By a 'disease or condition in which activation of AT2 receptors is desired or required but in which inhibition of CYPs is not desired', we include diseases or conditions that are known to be treatable by activation of AT2 receptors, such as those mentioned hereinafter, but wherein existing treatments of such conditions may comprise administration of other therapeutic agents that are metabolized by CYPs. Such diseases or conditions may thus include conditions in which inhibition of at least one CYP enzyme is not required, advantageous and/or desirable, or in which such inhibition is or would be detrimental to the patient.

Particular diseases or condition in which activation of AT2 receptors is desired or required but in which inhibition of CYP enzymes is not desired are interstitial lung diseases (e.g. pulmonary fibrosis, IPF, systemic sclerosis and sarcoidosis), autoimmune diseases (e.g. rheumatoid arthritis, systemic lupus erythematosus, multiple sclerosis, psoriasis and inflammatory bowel disease), chronic kidney diseases (e.g. diabetic nephropathy), pulmonary hypertension, pulmonary arterial hypertension and/or infarction (e.g. myocardial infarction and stroke). Thus, compounds of the invention are particularly useful in the treatment of interstitial lung diseases, such as IPF; autoimmune diseases, such as rheumatoid arthritis; chronic kidney diseases, such as diabetic nephropathy; pulmonary hypertension, including pulmonary arterial hypertension; and/or infarction, such as myocardial infarction.

According to a further aspect of the present invention, there is provided a method of treatment of a disease or condition in which activation of AT2 receptors is desired or required but in which inhibition of CYP enzymes is not desired (such as pulmonary fibrosis, in particular IPF), which method comprises administration of a therapeutically effective amount of a compound of the invention to a person suffering from the relevant condition.

The compounds of the invention are indicated both in the therapeutic, palliative, and/or diagnostic treatment, as well as the prophylactic treatment (by which we include preventing and/or abrogating deterioration and/or worsening of a condition) of any of the above conditions.

Compounds of the invention will normally be administered orally, intravenously, subcutaneously, buccally, rectally, dermally, nasally, tracheally, bronchially, by any other parenteral route, or via inhalation or pulmonary route, or any combination thereof, in a pharmaceutically acceptable dosage form, in solution, in suspension, in emulsion, including nanosuspensions, or in liposome formulation. Additional methods of administration include, but are not limited to, intraarterial, intramuscular, intraperitoneal, intraportal, intradermal, epidural, intrathecal administration, or any combination thereof.

In some embodiments, the compounds of the invention may be administered alone (e.g. separately), and/or sequentially, and/or in parallel at the same time (e.g. concurrently), using different administrative routes, but are preferably administered by way of known pharmaceutical formulations, including tablets, capsules or elixirs for oral administration, suppositories for rectal administration, sterile solutions, suspensions or emulsions for parenteral or intramuscular administration, or via inhalation, and the like. Administration through inhalation is preferably done by using a nebulizer, thus delivering the compound of the invention to the small lung tissue including the alveoli and bronchioles, preferably without causing irritation or cough in the treated subject.

Preferably, administration of a therapeutically effective amount of a compound of the invention is performed by a combination of administrative routes, either separately (e.g. about 2 or more hours apart from one another), sequentially (e.g. within about 2 hours of one another), or in parallel at the same time (e.g. concurrently), including via inhalation and orally, achieving an effective dosage.

In some embodiments, there is provided a method of treating a disease or condition in which activation of AT2 receptors is desired or required (and such diseases or conditions in which inhibition of CYP enzymes is not desired), including pulmonary fibrosis, and in particular IPF, which method comprises administering a therapeutically effective amount of a compound of the invention through a combination of administrative routes, either separately, sequentially, or in parallel at the same time, preferably via inhalation and orally, in order to achieve effective amount or dosage, to a patient in need of such a therapy.

Such combinations of administrative routes, preferably via inhalation and orally, may be presented as separate formulations of the compound of invention that are optimized for each administrative route.

Such formulations may be prepared in accordance with standard and/or accepted pharmaceutical practice.

According to a further aspect of the invention there is thus provided a pharmaceutical formulation comprising a compound of the invention, in admixture with a pharmaceutically acceptable adjuvant, diluent or carrier.

Compounds of the invention may be administered in combination with other AT2 agonists that are known in the art, such as C21, as well as in combination with AT1 receptor antagonists that are known in the art, and/or in combination with an inhibitor of angiotensin converting enzyme (ACE). Non-limiting but illustrative examples of AT1 receptor antagonists that can be used according to the embodiments include azilsartan, candesartan, eprosartan, fimasartan, irbesartan, losartan, milfasartan, olmesartan, pomisartan, pratosartan, ripiasartan, saprisartan, tasosartan, telmisartan, valsartan and/or combinations thereof. Non-limiting but illustrative examples of ACE inhibitors that can be used according to the embodiments include captopril, zofenopril, enalapril, ramipril, quinapril, perindopril, lisinopril, benazepril, imidapril, trandolapril, fosinopril, moexipril, cilazapril, spirapril, temocapril, alacepril, ceronapril, delepril, moveltipril, and/or combinations thereof.

Other active ingredients that may be administered in combination with compounds of the invention include disodium cromoglycate; endothelin receptor antagonists, such as bosentan, ambrisentan, sitaxentan and macitentan; PDE5 inhibitors, such as sildenafil and tadalafil; prostacyclin (epoprostenol) and analogues thereof, such as iloprost and treprostinil; other biologics including interferon gamma-1b, etanercept, infliximab and adalimumab; and methotrexate. Further active ingredients in development that may be co-administered with compounds of the invention include pamrevlumab (anti-CTGF, Fibrogen); GLPG1690 (autotaxin inhibitor, Galapagos), TD139 (Galectin-3 inhibitor, Galecto), PRM-151 (recombinant pentraxin-2, Promedior), BBT-877 (autotaxin inhibitor, Boehringer/Bridge), CC-90001 (JNK inhibitor, Celgene), PBI-4050 (dual GPR40 agonist/GPR84 antagonist, Prometic), BMS-986020 (lysophosphatidic acid receptor antagonist, BMS), RVT-1601 (mast cell stabilizer, Respivant), SM04646 (wnt-signal inhibitor, United Therapeutics), KD25 (Rho associated kinase inhibitor, Kadmon Holdings), BG00011 (integrin antagonist, Biogen), PLN-74809 (integrin antagonist, Pilant Therapeutics), Saracatinib (src kinase inhibitor, AstraZeneca), PAT-1251 (lysyloxidase inhibitor 2, PharmAkea), ABM-125 (IL-25 MAB, Abeome) and TA5-115 (multikinase inhibitor, Otsuka).

In a further aspect of the invention, compounds of the invention find particular utility when combined with other therapeutic agents in combination therapy to treat the various conditions, including those mentioned hereinbefore. Because compounds of the invention exhibit minimal CYP enzyme inhibition, such combinations are particularly advantageous when the other therapeutic agents that are employed for use in the relevant condition are themselves metabolized by CYP enzymes.

Thus, when the condition to be treated is an interstitial lung disease, such as IPF, systemic sclerosis or fibrotic diseases that are known in the art, compounds of the invention are preferably administered in combination with a Galectin-3 inhibitor, a lysophosphatidic acid receptor 1 (LPA1) antagonist, an autotaxin (ATX) inhibitor, a recombinant human pentraxin-2 protein or established therapies for such treatment, including but not limited to pirfenidone and/or nintedanib. Preferably, the combination of compound of the invention is with pirfenidone, or a pharmaceutically-acceptable salt thereof, which compound is known to be metabolized by CYP enzymes, such as CYP1A.

Further, when the condition to be treated is a chronic kidney related disease, compounds of the invention are preferably administered in combination with one or more other drugs that are also used in such treatments, such as irbesartan and/or torsemide, which compounds are known to be metabolized by CYP enzymes, such as CYP2C9.

When the condition to be treated is pulmonary hypertension, compounds of the invention are preferably administered in combination with one or more other drugs that are also used in such treatment, such as selexipag and/or sildenafil, which compounds are known to be metabolized by CYP enzymes, such as CYP3A4.

When the condition to be treated or prevented is myocardial infarction and/or a stroke-related disease, compounds of the invention are preferably administered in combination with one or more other drugs that are also used in such treatment, such as propranolol, warfarin, clopidogrel, atorvastatin, cilostazol, lidocaine and/or simvastatin, or a pharmaceutically-acceptable salt thereof, which compounds are known to be metabolized by CYP enzymes, such as CYP1A, CYP2CP and/or CYP3A4.

When the condition to be treated is an autoimmune disease, such as rheumatoid arthritis, multiple sclerosis or psoriasis, compounds of the invention are preferably administered in combination with one or more other drugs that are also used in such treatment, including but not limited to non-steroidal anti-inflammatory drugs (NSAIDs), such as naproxen, celecoxib, meloxicam or an analogue thereof (e.g. piroxicam) orindomethacin; or a drug such as tizanidine, cyclophosphamide, cyclosporine, deflazacort and/or hydrocortisone, riluzole, or a pharmaceutically-acceptable salt thereof, which compounds are known to be metabolized by CYP enzymes, such as CYP1A, CYP2CP, CYP2C19 and/or CYP3A4.

Thus, compounds of the invention are particularly useful in the treatment of a disease or condition in which activation of the AT2 receptor is desired or required but in which inhibition of CYP enzymes is not desired and so may be administered to treat diseases, including those mentioned hereinbefore, in combination with one or more of the other therapeutic agents mentioned hereinbefore, which are metabolized through a CYP enzyme pathway, is or may be useful, including pirfenidone, naproxen, propranolol, riluzole, tizanidine, warfarin, celecoxib, clopidogrel, irbesartan, meloxicam, piroxicam, torsemide, cyclophosphamide, indomethacin, atorvastatin, cilostazol, cyclosporine, deflazacort, hydrocortisone, lidocaine, selexipag, sildenafil and/or simvastatin. Most preferably, the compounds of the invention are administered in combination with pirfenidone to treat an interstitial lung disease, such as IPF.

When compounds of the invention are "combined" with other therapeutic agents as mentioned hereinbefore, the active ingredients may be administered together in the same formulation, or administered separately (simultaneously or sequentially) in different formulations.

Such combination products provide for the administration of compounds of the invention in conjunction with the other therapeutic agent, and may thus be presented either as separate formulations, wherein at least one of those formulations comprises a compound of the invention, and at least one comprises the other therapeutic agent, or may be presented (i.e. formulated) as a combined preparation (i.e. presented as a single formulation including a compound of the invention and the other therapeutic agent).

Thus, there is further provided:
(1) a pharmaceutical formulation including a compound of the invention; a therapeutic agent selected from those described above (e.g. one that is known to be metabolized by a CYP enzyme); and a pharmaceutically-acceptable excipient (e.g. adjuvant, diluent or carrier), which formulation is hereinafter referred to as a "combined preparation"; and
(2) a kit of parts comprising components:
(A) a pharmaceutical formulation including a compound of the invention in admixture with a pharmaceutically-acceptable adjuvant, diluent or carrier; and
(B) a pharmaceutical formulation including a therapeutic agent selected from those described above (e.g. one that is known to be metabolized by a CYP enzyme), in admixture with a pharmaceutically-acceptable adjuvant, diluent or carrier,
which components (A) and (B) are each provided in a form that is suitable for administration in conjunction with the other.

In a further aspect of the invention, there is provided a process for the preparation of a combined preparation as hereinbefore defined, which process comprises bringing into association a compound of the invention, the other therapeutic agent, and at least one (e.g. pharmaceutically-acceptable) excipient.

In a further aspect of the invention, there is provided a process for the preparation of a kit-of-parts as hereinbefore defined, which process comprises bringing into association components (A) and (B). As used herein, references to bringing into association will mean that the two components are rendered suitable for administration in conjunction with each other.

Thus, in relation to the process for the preparation of a kit-of-parts as hereinbefore defined, by bringing the two components "into association with" each other, we include that the two components of the kit-of-parts may be:
(i) provided as separate formulations (i.e. independently of one another), which are subsequently brought together for use in conjunction with each other in combination therapy; or
(ii) packaged and presented together as separate components of a "combination pack" for use in conjunction with each other in combination therapy.

Thus, there is further provided a kit-of-parts comprising:
(I) one of components (A) and (B) as defined herein; together with
(II) instructions to use that component in conjunction with the other of the two components.

Depending upon the patient to be treated and the route of administration, the compounds of the invention may be administered at varying doses. Although doses will vary from patient to patient, suitable daily doses are in the range of about 0.1 to about 1000 mg (e.g. 0.1, 0.5, 1, 2, 5, 10, 15, 20, 25, 30, 35, 40, 45, 50, 75, 100, 150, 200, 250, 300, 350, 400, 450, 500, 550, 600, 650, 700, 750, 800, 850, 900, 950, 1000 mg, and the like, or any range or value therein) per patient, administered in single or multiple doses. More preferred daily doses are in the range of about 0.1 to about 250 mg (e.g. 0.2, 0.3, 0.4, 0.5, 1, 1.5, 2, 2.5, 3, 3.5, 4. 4.5, 5, 5.5, 6, 6.5, 7, 7.5, 8, 8.5, 9, 9.5, 10, 15, 20, 25, 30, 35, 40, 45, 50, 55, 60, 65, 70, 75, 80, 85, 90, 95, 100, 110, 120, 130, 140, 150, 160, 170, 180, 190, 200, 210, 220, 230, 240, 250 mg, and the like, or any range or value therein) per patient. A particular preferred daily dose is in the range of from about 0.3 to about 100 mg per patient.

Individual doses of compounds of the invention may be in the range of about 0.1 to about 100 mg (e.g. 0.3, 0.5, 1, 2, 3, 4, 5, 6, 7, 8, 9, 10, 11, 12, 13, 14, 15, 16, 17, 18, 19, 20, 25, 30, 35, 40, 45, 50, 55, 60, 65, 70, 75, 80, 85, 90, 95, 100 mg, and the like, or any range or values therein).

In any event, the physician, or the skilled person, will be able to determine the actual dosage, which will be most suitable for an individual patient, which is likely to vary with the condition that is to be treated, as well as the age, weight, sex and response of the particular patient to be treated. The above-mentioned dosages are exemplary of the average case; there can, of course, be individual instances where higher or lower dosage ranges are merited, and such are within the scope of this invention.

The benefits of using the compounds of the invention, preferably via a combination of administrative routes, separately, and/or sequentially, and/or in parallel at the same time is to produce a tailored treatment for the patient in need of the therapy, with the possibility of preventing and/or reducing side effects, and also tune the correct dosage levels of a therapeutically effective amount of a compound of the invention.

The kits of parts described herein may comprise more than one formulation including an appropriate quantity/dose of a compound of the invention, and/or more than one formulation including an appropriate quantity/dose of the other therapeutic agent, in order to provide for repeat dosing. If more than one formulation (comprising either active compound) is present, such formulations may be the same, or may be different in terms of the dose of either compound, chemical composition(s) and/or physical form(s).

With respect to the kits of parts as described herein, by "administration in conjunction with", we include that respective formulations comprising a compound of the invention and other therapeutic agent are administered, sequentially, separately and/or simultaneously, over the course of treatment of the relevant condition.

Thus, in respect of the combination product according to the invention, the term "administration in conjunction with" includes that the two components of the combination product (compound of the invention and other therapeutic agent) are administered (optionally repeatedly), either together, or sufficiently closely in time, to enable a beneficial effect for the patient, that is greater, over the course of the treatment of the relevant condition, than if either a formulation comprising compound of the invention, or a formulation comprising the other agent, are administered (optionally repeatedly) alone, in the absence of the other component, over the same course of treatment. Determination of whether a combination provides a greater beneficial effect in respect of, and over the course of treatment of, a particular condition will depend upon the condition to be treated or prevented, but may be achieved routinely by the skilled person.

Further, in the context of a kit-of-parts according to the invention, the term "in conjunction with" includes that one or other of the two formulations may be administered (optionally repeatedly) prior to, after, and/or at the same time as, administration of the other component. When used in this context, the terms "administered simultaneously" and "administered at the same time as" include that individual doses of the relevant compound of the invention and other antiinflammatory agent are administered within 48 hours (e.g. 24 hours) of each other.

Pharmaceutical compositions/formulations, combination products and kits as described herein may be prepared in accordance with standard and/or accepted pharmaceutical practice.

Thus, in a further aspect of the invention there is provided a process for the preparation of a pharmaceutical composition/formulation, as hereinbefore defined, which process comprises bringing into association certain compounds of the invention, as hereinbefore defined, with one or more pharmaceutically-acceptable excipients (e.g. adjuvant, diluent and/or carrier).

In further aspects of the invention, there is provided a process for the preparation of a combination product or kit-of-parts as hereinbefore defined, which process comprises bringing into association certain compounds of the invention, as hereinbefore defined, with the other therapeutic agent that is useful in the treatment of the relevant disease or disorder, and at least one pharmaceutically-acceptable excipient.

Subjects suitable to be treated with formulations of the present invention include, but are not limited to, mammalian subjects, in particular human subjects.

When used herein in relation to a specific value (such as an amount), the term "about" (or similar terms, such as "approximately") will be understood as indicating that such values may vary by up to 10% (particularly, up to 5%, such as up to 1%) of the value defined. It is contemplated that, at each instance, such terms may be replaced with the notation "±10%", or the like (or by indicating a variance of a specific amount calculated based on the relevant value). It is also contemplated that, at each instance, such terms may be deleted.

Compounds of the invention have the advantage that they are more potent than, and/or are stable to metabolic hydrolysis, and/or do not inhibit the CYP enzymes mentioned hereinbefore.

The compounds of the invention may also have the advantage that they may be more efficacious than, be less toxic than, be longer acting than, be more potent than, produce fewer side effects than, be more easily absorbed than, and/or have a better pharmacokinetic profile (e.g. higher oral bioavailability and/or lower clearance) than, and/or have other useful pharmacological, physical, or chemical properties than compounds known in the prior art, whether for use in the treatment of IPF or otherwise. Such effects may be evaluated clinically, objectively and/or subjectively by a health care professional, a treatment subject or an observer.

EXAMPLES

The invention will be further described by reference to the following examples, which are not intended to limit the scope of the invention.

In the event that there is a discrepancy between nomenclature and any compounds depicted graphically, then it is the latter that presides (unless contradicted by any experimental details that may be given or unless it is clear from the context).

Experimental Procedures

Starting materials and intermediates used in the synthesis of compounds described herein are commercially available or can be prepared by the methods described herein or by methods known in the art.

Experiments were generally carried out under inert atmosphere (nitrogen or argon), particularly in cases where oxygen- or moisture-sensitive reagents or intermediates were used.

Mass spectrometry data are reported from liquid chromatography-mass spectrometry (LC-MS). Chemical shifts for NMR data are expressed in parts per million (ppm, $\delta$) referenced to residual peaks from the deuterated solvent used.

For syntheses referencing general procedures, reaction conditions (such as length of reaction or temperature) may vary. In general, reactions were followed by thin layer chromatography or LC-MS, and subjected to work-up when appropriate. Purifications may vary between experiments: in general, solvents and the solvent ratios used for eluents/gradients were chosen to provide an appropriate $R_f$ and/or retention time. Some products were purified using supercritical fluid chromatography, for example on a reversed phase column using solvent combinations with mobile phase A: $CO_2$ and B: $MeOH/H_2O/NH_3$.

Compounds of the Invention

Compounds were prepared in accordance with the following synthetic scheme, which shows the synthesis of 1-benzyl-3-[[5-isobutyl-3-[4-[(2-methylimidazol-1-yl)methyl]phenyl]-2-thienyl]sulfonyl]urea (Example 1):

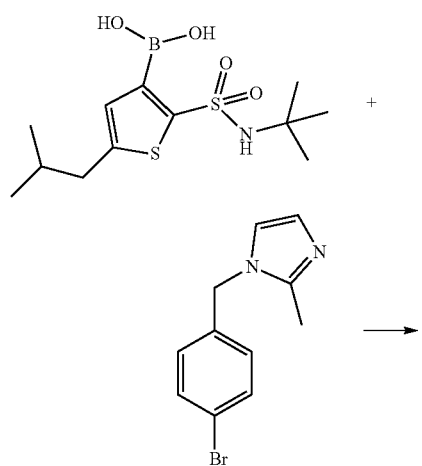

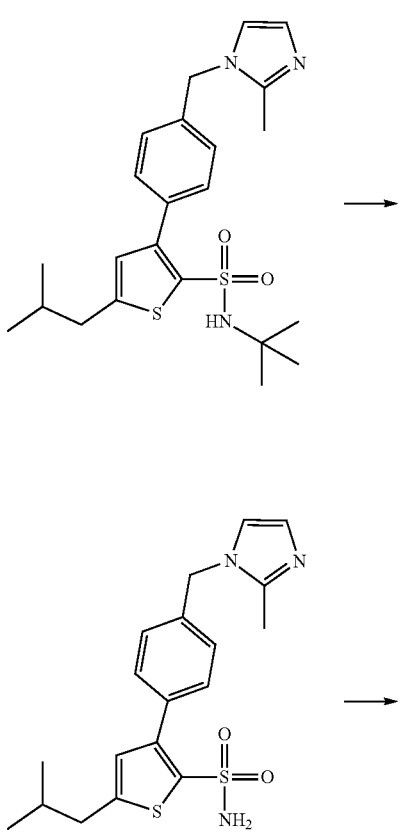

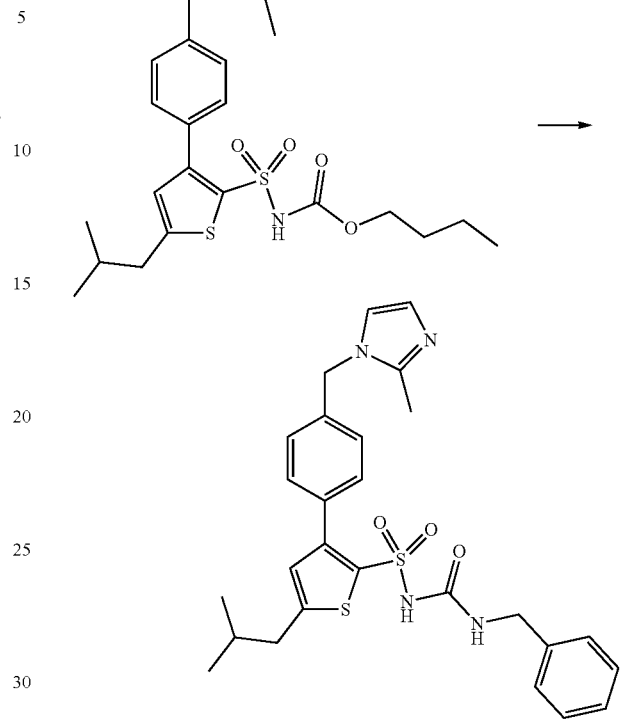

Example 1

Benzyl-3-[[5-isobutyl-3-[4-[(2-methylimidazol-1-yl)methyl]phenyl]-2-thienyl]sulfonyl]urea (a) N-tert-butyl-5-isobutyl-3-[4-[(2-methylimidazol-1-yl)methyl]phenyl]thiophene-2-sulfonamide 1-[(4-Bromophenyl)methyl]-2-methyl-imidazole (1.25 g; 5 mmol; prepared using procedures similar to literature for 1-[(4-bromophenyl)methyl]-2-methyl-imidazole (see e.g. international patent application WO 2002/096883)), 5-isobutyl-2-(tert-butylaminosulfonyl)-3-thiopheneboronic acid (1.59 g; 5 mmol; prepared as described in international patent application WO 2002/096883), $K_2CO_3$ (2.06 g; 15 mmol) and $Pd(PPh_3)_4$ (144 mg; 120 μmol) were added to dioxane (100 mL) and water (10 mL). The mixture was heated to 95° C. overnight under a nitrogen atmosphere. Most of the solvent was evaporated. Water was added (50 mL) and the product was extracted with diethyl ether (2×50 mL). After drying and evaporation, the isolated sub-title compound was used directly in the next step.

(b) 5-Isobutyl-3-[4-[(2-methylimidazol-1-yl)methyl]phenyl]thiophene-2-sulfonamide The sub-title compound from step (a) above (1.36 g) was dissolved in DCM (30 mL). Boron trichloride (15 mL, 1M in DCM) was added and the solution was stirred 2 h at room temperature. $Na_2CO_3$ (sat., 20 mL) was added and the product was extracted with EtOAc (40 mL). After drying and evaporation the isolated sub-title compound was used directly in the next step.

(c) Butyl N-[[5-isobutyl-3-[4-[(2-methylimidazol-1-yl)methyl]phenyl]-2-thienyl]sulfonyl]-carbamate The sub-title compound from step (b) above (1.2 g) and N-ethyldiisopropylamine (2.57 g; 20 mmol) were dissolved in DCM. Butyl chloroformate (2.04 g; 15 mmol) was added slowly at room temperature. After 1 h, water was added and the product was extracted with diethyl ether. Chromatography from DCM-MeOH (90:10). The amount of sub-title compound that was isolated was 1.05 g (yield 43% over the three reaction steps).
$^1$H-NMR (CDCl$_3$): 0.85 (t, 3H), 0.99 (d, 6H), 1.24 (m, 2H), 1.48 (m, 2H), 1.94 (m, 1H), 2.54 (s, 3H), 2.69 (d, 2H), 3.99 (t, 2H), 5.11 (s, 2H), 6.72 (s, 1H), 6.81 (m, 2H), 7.07 (d, 2H), 7.60 (d, 2H)
MS (M+H$^+$): experimental 490.1824 calculated 490.1834.

(d) 1-Benzyl-3-[[5-isobutyl-3-[4-[(2-methylimidazol-1-yl)methyl]phenyl]-2-thienyl]sulfonyl]-urea The subtitle compound from step (c) above (116 mg, 237 µmol) and benzylamine (76 mg; 711 µmol) were dissolved in toluene. The reaction was heated and kept at 100° C. for over 3 h under a nitrogen atmosphere. The solvents were evaporated. The title product was purified using supercritical fluid chromatography in a yield of 51 mg (41%).
$^1$H-NMR (CDCl$_3$): 0.95 (d, 6H), 1.87 (m, 1H), 2.31 (s, 3H), 2.63 (d, 2H), 4.20 (s, 2H), 5.04 (s, 2H), 6.67 (s, 1H), 6.83 (NH, 1H), 6.87-6.95 (m, 4H), 7.12-7.23 (m, 5H), 7.42 (d, 2H).
MS (M+H$^+$): experimental 523.1818 calculated 523.1838.

Example 2

3-(5-isobutyl-3-{p-[(2-Methyl-1H-imidazol-1-yl)methyl]phenyl}-2-thienylsulfonyl)-1-[(2-pyridyl)methyl]urea The title compound was prepared as described in Example 1, using 2-aminomethylpyridine in the final step.
$^1$H-NMR (CDCl$_3$): 0.96 (d, 6H), 1.91 (m, 1H), 2.66 (d, 2H), 2.74 (s, 3H), 4.70 (s, 2H), 5.37 (s, 2H), 6.73 (s, 1H), 7.21 (s, 1H), 7.28 (d, 2H), 7.41 (s, 1H), 7.53 (d, 2H), 7.76 (m, 1H), 7.89 (m, 1H), 8.30 (m, 1H), 8.70 (m, 1H).
MS (M+H$^+$): experimental 524.1774 calculated 524.1790.

Example 3

3-(5-isobutyl-3-{p-[(2-Methyl-1H-imidazol-1-yl)methyl]phenyl}-2-thienylsulfonyl)-1-(3,3,3-trifluoropropyl)-urea The title compound was prepared as described in Example 1, using 3,3,3-trifluoropropyl-amine in the final step.
MS (M+H$^+$): experimental 529.1552 calculated 529.1555.

Example 4

1-Butyl-3-(5-isobutyl-3-{p-[(2-methyl-1H-imidazol-1-yl)methyl]phenyl}-2-thienylsulfonyl)-urea The title compound was prepared as described in Example 1, using 1-aminobutane in the final step.
MS (M+H$^+$): experimental 489.1999 calculated 489.2078.

Example 5

3-(5-isobutyl-3-{p-[(2-Methyl-1H-imidazol-1-yl)methyl]phenyl}-2-thienylsulfonyl)-1-(4,4,4-trifluorobutyl)-urea The title compound was prepared as described in Example 1, using 4,4,4-trifluorobutyl-amine in the final step.
$^1$H-NMR (CDCl$_3$): 0.95 (d, 6H), 1.61 (m, 2H), 1.86-2.02 (m, 3H), 2.56 (s, 3H), 2.65 (d, 2H), 3.11 (m, 2H), 6.70 (s, 2H), 7.05 (b, 1H), 7.11-7.13 (b, 3H), 7.50 (d, 2H).
MS (M+H$^+$): experimental 543.1727 calculated 543.1711.

Example 6

1-Benzyl-3-(3-{p-[(2-ethyl-1H-imidazol-1-yl)methyl]phenyl}-5-isobutyl-2-thienylsulfonyl)-urea The title compound was prepared as described in Example 1 except that 1-[(4-bromo-phenyl)methyl]-2-ethyl-imidazole was used in the first step (prepared using procedures similar to literature for 1-[(4-bromophenyl)methyl]-2-methyl-imidazole (see e.g. international patent application WO 2002/096883)).
MS (M+H$^+$): experimental 537.1996 calculated 537.1994.

Example 7

3-(3-{p-[(2-Ethyl-1H-imidazol-1-yl)methyl]phenyl}-5-isobutyl-2-thienylsulfonyl)-1-(2-methoxy-ethyl)urea The title compound was prepared as described in Example 1 using 1-[(4-bromophenyl)-methyl]-2-ethyl-imidazole in the first step and 2-methoxyethylamine in the final step.
$^1$H-NMR (CDCl$_3$): 0.96 (d, 6H), 1.38 (t, 3H), 1.91 (m, 1H), 1.67 (d, 2H), 3.06 (q, 2H), 3.25-3.30 (b, 2H), 3.28 (s, 3H), 3.36 (t, 2H), 5.25 (s, 2H), 6.71 (s, 1H), 7.15-7.30 (b, 4H), 7.54 (d, 2H).
MS (M+H$^+$): experimental 505.1973 calculated 505.1943.

Example 8

3-(3-{p-[(2,4-Dimethyl-1H-imidazol-1-yl)methyl]phenyl}-5-isobutyl-2-thienylsulfonyl)-1-(3,3,3-trifluoropropyl)urea The title compound was prepared as described in Example 1 using 1-[(4-bromophenyl)-methyl]-2,4-dimethyl-imidazole in the first step (prepared using procedures similar to literature for 1-[(4-bromophenyl)methyl]-2-methyl-imidazole (see e.g. international patent application WO 2002/096883)) and 2-methoxyethylamine in the final step.
$^1$H-NMR (CDCl$_3$): 0.93 (d, 6H), 1.86 (m, 1H), 2.09-2.21 (b, 2H), 2.15 (s, 3H), 2.42 (s, 3H), 2.61 (d, 2H), 3.20 (m, 2H), 5.08 (s, 2H), 6.65 (s, 1H), 6.79 (s, 1H), 7.03 (d, 2H), 7.48 (d, 2H).
MS (M+H$^+$): experimental 543.1707 calculated 543.1711.

Example 9

3-(3-{p-[(2-Ethyl-1H-imidazol-1-yl)methyl]phenyl}-5-isobutyl-2-thienylsulfonyl)-1-[(2-pyridyl)methyl]urea The title compound was prepared as described in Example 1 using 1-[(4-bromophenyl)methyl]-2-ethyl-imidazole in the first step and 2-aminomethylpyridine in the final step. The amount of title compound that was isolated was 45 mg (21%).

$^1$H-NMR (CDCl$_3$): 0.93 (q, 6H). 1.18 (t, 3H), 1.87 (m, 1H), 2.62 (d, 2H), 2.69 (q, 2H), 4.35 (d, 2H), 5.07 (s, 2H), 6.67 (s, 1H), 6.95 (m, 4H), 7.10 (m, 1H), 7.16 (d, 1H), 7.49 (d, 2H), 7.55 (td, 1H), 8.40 (d, 1H).

MS (M+H$^+$): experimental 538.2

Example 10

1-Benzyl-3-(3-{p-[(2,4-dimethyl-1H-imidazol-1-yl) methyl]phenyl}-5-isobutyl-2-thienylsulfonyl)urea The title compound was prepared as described in Example 1 using 1-[(4-bromophenyl)-methyl]-2,4-dimethyl-imidazole in the first step. The amount of title compound that was isolated was 34 mg (26%).

$^1$H-NMR (CDCl$_3$): 0.95 (d, 6H), 1.87 (m, 1H), 2.09 (s, 3H), 2.29 (s, 3H), 2.62 (d, 2H), 4.21 (d, 2H), 4.95 (s, 2H), 6.62 (s, 1H), 6.67 (s, 1H), 6.94 (d, 2H), 7.10-7.25 (m, 5H), 7.45 (d, 2H).).

MS (M+H$^+$): experimental 537.3

Example 11

3-(3-{p-[(2,4-Dimethyl-1H-imidazol-1-yl)methyl] phenyl}-5-isobutyl-2-thienylsulfonyl)-1-[(2-pyridyl) methyl]urea The title compound was prepared as described in Example 1 using 1-[(4-bromophenyl)-methyl]-2,4-dimethyl-imidazole in the first step and 2-aminomethylpyridine in the final step. The amount of title compound that was isolated was 12 mg (7%).

$^1$H-NMR (CDCl$_3$): 0.94 (d, 6H), 1.87 (m, 1H), 2.10 (s, 3H), 2.31 (s, 3H), 2.61 (d, 2H), 4.36 (d, 2H), 4.97 (s, 2H), 6.63 (s, 1H), 6.68 (s, 1H), 6.99 (d, 2H), 7.11 (m, 2H), 7.53 (m, 3H), 8.42 (d, 1H).

MS (M+H$^+$): experimental 538.2

Example 12

1-Benzyl-3-(3-{3-fluoro-4-[(2-methyl-1H-imidazol-1-yl)methyl]phenyl}-5-isobutyl-2-thienylsulfonyl) urea The title compound was prepared as described in Example 1 using 1-[(4-bromo-2-fluorophenyl)methyl]-2-methyl-imidazole in the first step (prepared using procedures similar to literature for 1-[(4-bromophenyl)methyl]-2-methyl-imidazole (see e.g. international patent application WO 2002/096883)). The amount of title compound that was isolated was 20 mg (24%).

$^1$H-NMR (CDCl$_3$): 0.98 (d, 6H), 1.90 (m, 1H), 2.66 (d, 2H), 4.30 (d, 2H), 5.05 (s, 2H), 6.71 (s, 1H), 6.77 (s, 1H), 6.86 (s, 1H), 6.91 (t, 1H), 7.13 (m, 2H), 7.22-7.28 (m, 4H), 7.32 (d, 1H).

MS (M+H$^+$): experimental 541.2

Example 13

3-(3-{3-Fluoro-4-[(2-methyl-1H-imidazol-1-yl) methyl]phenyl}-5-isobutyl-2-thienylsulfonyl)-1-[(2-pyridyl)methyl]urea The title compound was prepared as described in Example 1 using 1-[(4-bromo-2-fluorophenyl)methyl]-2-methyl-imidazole in the first step and 2-aminomethylpyridine in the final step. The amount of title compound that was isolated was 24 mg (31%).

$^1$H-NMR (CDCl$_3$): 0.94 (d, 6H), 1.88 (m, 1H), 2.43 (s, 3H), 2.63 (d, 2H), 4.41 (d, 2H), 5.05 (s, 2H), 6.67 (s, 1H), 6.87-6.95 (m, 3H), 7.10 (m, 1H), 7.16 (d, 1H), 7.28-7.38 (m, 2H), 7.56 (t, 1H), 8.42 (d, 1H).

MS (M+H$^+$): experimental 542.2

Example 14

3-(3-{3-Fluoro-4-[(2-methyl-1H-imidazol-1-yl) methyl]phenyl}-5-isobutyl-2-thienylsulfonyl)-1-(3,3, 3-trifluoropropyl)urea The title compound was prepared as described in Example 1 using 1-[(4-bromo-2-fluorophenyl)methyl]-2-methyl-imidazole in the first step and 3,3,3-trifluoropropylamine in the final step. The amount of title compound that was isolated was 15 mg (21%).

$^1$H-NMR (CDCl$_3$): 0.98 (d, 6H), 1.92 (m, 1H), 2.49 (m, 2H), 2.67 (d, 2H), 3.34 (m, 2H), 5.10 (s, 2H), 6.71 (s, 1H), 6.85 (s, 1H), 6.93 (s, 1H), 7.01 (m, 1H), 7.30 (m, 1H), 7.38 (d, 1H).

MS (M+H$^+$): experimental 547.2

Example 15

1-(3-{3-Fluoro-4-[(2-methyl-1H-imidazol-1-yl) methyl]phenyl}-5-isobutyl-2-thienylsulfonyl)-3-[(1-methyl-1H-imidazol-2-yl)methyl]urea The title compound was prepared as described in Example 1 using 1-[(4-bromo-2-fluorophenyl)methyl]-2-methyl-imidazole in the first step and (1-methyl-1H-imidazol-2-yl) methylamine in the final step. The amount of title compound that was isolated was 69 mg (50%).

MS (M+H$^+$): experimental 545.2

Example 16

1-(3-{3-Fluoro-4-[(2-methyl-1H-imidazol-1-yl) methyl]phenyl}-5-isobutyl-2-thienylsulfonyl)-3-[2-(1H-imidazol-4-yl)ethyl]urea The title compound was prepared as described in Example 1 using 1-[(4-bromo-2-fluorophenyl)methyl]-2-methyl-imidazole in the first step and histamine in the final step. The amount of title compound that was isolated was 52 mg (47%).

MS (M+H$^+$): experimental 545.2

Example 17

3-(3-{3-Fluoro-4-[(2-methyl-1H-imidazol-1-yl) methyl]phenyl}-5-isobutyl-2-thienylsulfonyl)-1-methyl-1-[(2-pyridyl)methyl]urea The title compound was prepared as described in Example 1 using 1-[(4-bromo-2-fluorophenyl)methyl]-2-methyl-imidazole in the first step and N-methyl-N-(2-pyridylmethyl) amine in the final step. The amount of title compound that was isolated was 17 mg (16%).

$^1$H-NMR (CDCl$_3$): 0.96 (d, 6H), 1.89 (m, 1H), 2.45 (s, 3H), 2.64 (d, 2H), 2.91 (s, 3H), 4.38 (s, 2H), 5.10 (s, 2H), 6.65 (s, 1H), 6.65-6.75 (b, 2H),7.00-7.25 (b, 3H), 7.43 (m, 2H), 7.60 (m, 1H), 8.41 (m, 1H).

MS (M+H$^+$): experimental 556.2

Example 18

3-(3-{3-Fluoro-4-[(2-methyl-1H-imidazol-1-yl)methyl]phenyl}-5-isobutyl-2-thienylsulfonyl)-1-(4,4,4-trifluorobutyl)urea The title compound was prepared as described in Example 1 using 1-[(4-bromo-2-fluorophenyl)methyl]-2-methyl-imidazole in the first step and 4,4,4-trifluorobutylamine in the final step. The amount of title compound that was isolated was 8 mg (12%).

$^1$H-NMR (CDCl$_3$): 0.96 (d, 6H), 1.64 (m, 2H), 1.82-2.02 (m, 3H), 2.51 (s, 3H), 2.65 (d, 2H), 3.15 (m, 2H), 5.10 (s, 2H), 6.70 (s, 1H), 6.88 (s, 1H), 6.96 (s, 1H), 7.01 (t, 1H), 7.28 (d, 1H), 7.38 (d, 1H).

MS (M+H$^+$): experimental 561.2

Example 19

3-(5-Isobutyl-3-{5-[(2-methyl-1H-imidazol-1-yl)methyl]-2-pyridyl}-2-thienylsulfonyl)-1-(3,3,3-trifluoropropyl)urea The title compound was prepared as described in Example 1 using 2-bromo-5-[(2-methylimidazol-1-yl)methyl]pyridine in the first step (prepared using procedures similar to literature for 1-[(4-bromophenyl)methyl]-2-methyl-imidazole (see e.g. international patent application WO 2002/096883)) and 3,3,3-trifluoropropylamine in the final step. The amount of title compound that was isolated was 11 mg (15%).

MS (M+H$^+$): experimental 530.2

Example 20

3-(5-Isobutyl-3-{2-[(2-methyl-1H-imidazol-1-yl)methyl]-5-pyrimidinyl}-2-thienylsulfonyl)-1-(2-methoxyethyl)urea The title compound was prepared as described in Example 1 using 5-bromo-2-[(2-methylimidazol-1-yl)methyl]pyrimidine in the first step (prepared using procedures similar to literature for 1-[(4-bromophenyl)methyl]-2-methyl-imidazole (see e.g. international patent application WO 2002/096883)) and 2-methoxymethylamine in the final step. The amount of title compound that was isolated was 15 mg (17%).

$^1$H-NMR (CDCl$_3$): 0.97 (d, 6H), 1.90 (m, 1H), 2.51 (s, 3H), 2.67 (d, 2H), 3.29 (m, 5H), 3.37 (t, 2H), 5.37 (s, 2H), 6.69 (s, 1H), 7.06 (s, 1H), 7.13 (s, 1H), 8.90 (s, 2H).

MS (M+H$^+$): experimental 493.2

Example 21

3-(5-Isobutyl-3-{2-[(2-methyl-1H-imidazol-1-yl)methyl]-5-pyrimidinyl}-2-thienylsulfonyl)-1-(3,3,3-trifluoropropyl)urea The title compound was prepared as described in Example 1 using 5-bromo-2-[(2-methylimidazol-1-yl)methyl]pyrimidine in the first step and 3,3,3-trifluoropropylamine in the final step. The amount of title compound that was isolated was 43 mg (46%).

MS (M+H$^+$): experimental 531.2

Example 22

3-(5-Isobutyl-3-{2-[(2-methyl-1H-imidazol-1-yl)methyl]-5-pyrimidinyl}-2-thienylsulfonyl)-1-[(2-pyridyl)methyl]urea The title compound was prepared as described in Example 1 using 5-bromo-2-[(2-methylimidazol-1-yl)methyl]pyrimidine in the first step and 2-aminomethylpyrirdine in the final step. The amount of title compound that was isolated was 61 mg (32%).

$^1$H-NMR (CD$_3$OD): 0.98 (d, 6H), 1.91 (m, 1H), 2.39 (s, 3H), 2.69 (d, 2H), 4.30 (s, 2H), 5.37 (s, 2H), 6.84 (m, 2H), 7.08 (s, 1H), 7.23 (m, 2H), 7.71 (m, 1H), 8.39 (m, 1H), 9.02 (s, 2H).

MS (M+H$^+$): experimental 526.2

Example 23

1-[(3,5-Difluorophenyl)methyl]-3-(5-isobutyl-3-{5-[(2-methyl-1H-imidazol-1-yl)methyl]-2-pyridyl}-2-thienylsulfonyl)urea The title compound was prepared as described in Example 1 using 5-bromo-2-[(2-methylimidazol-1-yl)methyl]pyrimidine in the first step and 3,5-difluorobenzylamine in the final step. The amount of title compound that was isolated was 26 mg (42%).

$^1$H-NMR (CDCl$_3$): 1.02 (d, 6H), 1.97 (m, 1H), 2.39 (s, 3H), 2.74 (d, 2H), 4.46 (s, 2H), 5.16 (s, 2H), 6.70 (t, 1H), 6.79 (d, 2H), 6.89 (s, 1H), 7.03 (s, 1H), 7.10 (s, 1H), 7.40 (m, 1H), 7.61 (m, 1H), 8.61 (m, 1H).

MS (M+H$^+$): experimental 560.2

Example 24

3-(3-{3-Fluoro-4-[(2-methyl-1H-imidazol-1-yl)methyl]phenyl}-5-isobutyl-2-thienylsulfonyl)-1-(2-methoxyethyl)urea The title compound was prepared as described in Example 1 using 1-[(4-bromo-2-fluorophenyl)methyl]-2-methyl-imidazole in the first step and 2-methoxyethylamine in the final step. The amount of title compound that was isolated was 2 mg (3%).

$^1$H-NMR (CDCl$_3$): 1.00 (d, 6H), 1.94 (m, 1H), 2.48 (s, 3H), 2.69 (d, 2H), 3.31 (m, 5H), 3.38 (t, 2H), 5.12 (s, 2H), 6.72 (s, 1H), 6.88 (s, 1H), 6.93 (s, 1H), 6.98 (t, 1H), 7.33 (d, 1H), 7.37 (d, 1H).

MS (M+H$^+$): experimental 509.2

Example 25

3-(3-{3-Fluoro-4-[(2-methyl-1H-imidazol-1-yl)methyl]phenyl}-5-isobutyl-2-thienylsulfonyl)-1-[1-(2-pyridyl)ethyl]urea The title compound was prepared as described in Example 1 using 1-[(4-bromo-2-fluorophenyl)methyl]-2-methyl-imidazole in the first step and 1-pyridin-2-yl-ethylamine in the final step. The amount of title compound that was isolated was 6 mg (9%).

$^1$H-NMR (CDCl$_3$): 0.97 (d, 6H), 1.40 (d, 3H), 1.90 (m, 1H), 2.43 (s, 3H), 2.66 (d, 2H), 4.94 (m, 1H), 5.06 (s, 2H), 6.71 (s, 1H), 6.81 (s, 1H), 6.87 (s, 1H), 6.92 (t, 1H), 7.13-7.19 (m, 2H), 7.31 (d, 1H), 7.36 (d, 1H), 7.60 (t, 1H), 8.50 (d, 1H).
MS (M+H$^+$): experimental 556.2

Example 26

3-(3-{2-Fluoro-4-[(2-methyl-1H-imidazol-1-yl) methyl]phenyl}-5-isobutyl-2-thienylsulfonyl)-1-(3,3,3-trifluoropropyl)urea The title compound was prepared as described in Example 1 using 1-[(4-bromo-3-fluorophenyl)methyl]-2-methyl-imidazole in the first step (prepared using procedures similar to literature for 1-[(4-bromophenyl)methyl]-2-methyl-imidazole (see e.g. international patent application WO 2002/096883)) and 3,3,3-trifluoropropylamine in the final step. The amount of title compound that was isolated was 7 mg (6%).
$^1$H-NMR (CDCl$_3$): 1.01 (d, 6H), 1.96 (m, 1H), 2.31 (m, 2H), 2.63 (s, 3H), 2.73 (d, 2H), 3.41 (q, 2H), 5.25 (s, 2H), 6.75 (s, 1H), 6.95 (m, 2H), 7.13 (d, 1H), 7.26 (d, 1H), 7.49 (t, 1H).
MS (M+H$^+$): experimental 547

Example 27

3-(3-{2-Fluoro-4-[(2-methyl-1H-imidazol-1-yl) methyl]phenyl}-5-isobutyl-2-thienylsulfonyl)-1-(2,2,2-trifluoroethyl)urea The title compound was prepared as described in Example 1 using 1-[(4-bromo-3-fluorophenyl)methyl]-2-methyl-imidazole in the first step and 2,2,2-trifluoroethylamine in the final step. The amount of title compound that was isolated was 7 mg (5%).
$^1$H-NMR (CDCl$_3$): 1.01 (d, 6H), 1.96 (m, 1H), 2.62 (s, 3H), 2.73 (d, 2H), 3.80 (m, 2H), 5.25 (s, 2H), 6.75 (s, 1H), 6.92-6.97 (m, 2H), 7.14 (d, 1H), 7.26 (d, 1H), 7.48 (t, 1H).
MS (M+H$^+$): experimental 533

Example 28

1-(3-Fluoropropyl)-3-(5-isobutyl-3-{p-[(2-methyl-1H-imidazol-1-yl)methyl]phenyl}-2-thienylsulfonyl) urea The title compound was prepared as described in Example 1, using 3-fluoropropylamine hydrochloride in the final step. The amount of title compound that was isolated was 55 mg (26%).
$^1$H-NMR (CDCl$_3$): 1.01 (d, 6H), 1.84 (dp, 2H), 1.96 (m, 1H), 2.67 (s, 3H), 2.72 (d, 2H), 3.25 (q, 2H), 4.41 (dt, 2H), 5.25 (s, 2H), 6.77 (s, 1H), 7.11 (d, 1H), 7.21 (d, 2H), 7.26 (d, 1H), 7.57 (d, 2H).
MS (M+H$^+$): experimental 493

Example 29

1-(3,3-Difluoropropyl)-3-(5-isobutyl-3-{p-[(2-methyl-1H-imidazol-1-yl)methyl]phenyl}-2-thienylsulfonyl)urea The title compound was prepared as described in Example 1, using 3,3-difluoropropylamine hydrochloride in the final step.

$^1$H-NMR (CDCl$_3$): 1.01 (d, 6H), 1.91-2.03 (m, 3H), 2.56 (s, 3H), 2.72 (d, 2H), 3.28 (q, 2H), 5.20 (s, 2H), 5.77 (tt, 2H), 6.77 (s, 1H), 7.06 (s, 1H), 7.08 (s, 1H), 7.17 (d, 2H), 7.55 (d, 2H).

Example 30

1-[(3-{4-[(2-ethyl-1H-imidazol-1-yl)methyl]-3-fluorophenyl}-5-(2-methylpropyl)thiophen-2-yl)sulfonyl]-3-(3,3,3-trifluoropropyl)urea trifluoroacetic acid (a) N-tert-butyl-3-{4-[(2-ethyl-1H-imidazol-1-yl) methyl]-3-fluorophenyl}-5-(2-methylpropyl)thiophene-2-sulfonamide 5-isobutyl-2-(tert-butylaminosulfonyl)-3-thiopheneboronic acid (803 mg; 2.5 mmol), 1-[(4-bromo-2-fluorophenyl)methyl]-2-ethyl-imidazole (712 mg; 2.5 mmol; prepared using procedures similar to literature for 1-[(4-bromophenyl)methyl]-2-methyl-imidazole (see e.g. international patent application WO 2002/096883)), K$_2$CO$_3$ (1.04 g; 7.5 mmol) and [1,1'Bis(diphenylphosphino)ferrocene]dichloropalladium(II) (184 mg; 0.25 mmol) are added to dioxane (10 ml) and water (3 ml). The mixture was thoroughly degassed (by bubbling argon through the stirred suspension) and vigorously stirred and heated at 80° C. for 2 h. After cooling to room temperature, water was added and the crude product was extracted with EtOAc. After drying and evaporation, the crude product was purified on silica gel (Autoflash, Biotage Sfär Silica, 60 µm, 25 g). Mobile phases are DCM and DCM/MeOH/NH$_3$ (28%)=100/10/1. Gradient of the latter mobile phase is: 5-60%. The amount of subtitle compound that was isolated was 760 mg (63%).
$^1$H-NMR (400 MHz, DMSO-d6) δ 7.45 (m, 2H), 7.36 (d, 3=7.9 Hz, 1H), 7.09 (s, 1H), 7.03 (t, 3=8.1 Hz, 1H), 6.97 (s, 1H), 6.80 (s, 1H), 5.23 (s, 2H), 2.68 (d, 3=7.0 Hz, 2H), 2.60 (q, 3=7.5 Hz, 2H), 1.87 (dt, 3=13.0, 6.6 Hz, 1H), 1.16 (t, 3=7.1 Hz, 3H), 0.96 (s, 9H), 0.92 (d, 3=6.6 Hz, 6H).

(b) 3-{4-[(2-ethyl-1H-imidazol-1-yl)methyl]-3-fluorophenyl}-5-(2-methylpropyl)thiophene-2-sulfonamide The subtitle compound from step (a) above (760 mg; 1.6 mmol), triethylsilane (1.5 ml) and TFA (10 ml) were added to DCM (10 ml) and stirred at 43° C. overnight. The mixture was evaporated, giving a brown oil. NaHCO$_3$ (sat., 25 ml) was added and the crude product was extracted with EtOAc (250 ml). After drying and evaporation, the crude product was purified on silica gel (Autoflash, Biotage Sfär Silica, 60 µm, 25 g). Mobile phases are DCM and DCM/MeOH/NH$_3$ (28%)=100/10/1. Gradient of the latter mobile phase is: 5-50%. The amount of subtitle compound that was isolated was 420 mg (62%).
$^1$H-NMR (400 MHz, DMSO-d6) δ 7.66 (s, 2H), 7.49 (d, 3=11.4 Hz, 1H), 7.38 (d, 3=8.0 Hz, 1H), 7.10 (s, 1H), 7.00 (t, 3=8.0 Hz, 1H), 6.96 (s, 1H), 6.81 (s, 1H), 5.23 (s, 2H), 2.68 (d, 3=7.0 Hz, 2H), 2.62 (q, 3=7.5 Hz, 2H), 1.87 (dt, 3=13.6, 6.7 Hz, 1H), 1.19-1.15 (m, 3H), 0.93 (d, 3=6.6 Hz, 6H).

(c) Ethyl N-[(3-{4-[(2-ethyl-1H-imidazol-1-yl) methyl]-3-fluorophenyl}-5-(2-methylpropyl)thiophen-2-yl)sulfonyl]carbamate The subtitle compound from step (b) above (0.46 g; 1.1 mmol), ethyl chloroformate (0.12 g; 1.1 mmol) and triethylamine (0.22 g; 2.2 mmol) were mixed in 40 ml of DCM at 0° C. and stirred for 1 h. Water was added and the solvents were removed under reduced pressure. The amount of subtitle compound that was isolated was 0.69 g (100%). HPLC purity (220 nm): 95%.

$^1$H-NMR (400 MHz, DMSO-d6) δ 7.80 (d, 3=12.1 Hz, 1H), 7.48 (d, 3=8.0 Hz, 1H), 7.27 (s, 1H), 7.08-7.02 (m, 2H), 6.84 (s, 1H), 5.29 (s, 2H), 3.71 (q, 3=7.1 Hz, 2H), 2.75 (q, 3=7.5 Hz, 2H), 2.61 (d, 3=7.0 Hz, 2H), 1.84 (dp, 3=13.5, 6.7 Hz, 1H), 1.19 (t, 3=7.3 Hz, 3H, overlap with triethylamine), 0.99 (t, 3=7.1 Hz, 3H), 0.93 (d, 3=6.6 Hz, 6H). Contains ~2 equivalents of triethylamine.

MS (M+H$^+$): experimental 494 calculated 494.

(d) 1-[(3-{4-[(2-ethyl-1H-imidazol-1-yl)methyl]-3-fluorophenyl}-5-(2-methylpropyl)thiophen-2-yl)sulfonyl]-3-(3,3,3-trifluoropropyl)urea trifluoroacetic acid The subtitle compound from step (c) above (47 mg; 75 μmol), triethylamine (15 mg; 150 μmol) and 3,3,3-trifluoropropylamine hydrochloride (12 mg; 82 μmol) were added to dioxane (1 ml) and stirred at 90° C. overnight. The mixture was diluted with water and acetonitrile, acidified with TFA, and purified with reversed phase chromatography (Gemini NX-C18, 21*150 mm, water (0.1% TFA)/acetonitrile, gradient over 12 minutes, 25 ml/min). The amount of title compound that was isolated was 41 mg (81%). HPLC purity (220 nm): >95%.

$^1$H-NMR (400 MHz, DMSO-d6) δ 7.69-7.63 (m, 2H), 7.47 (d, 3=11.3 Hz, 1H), 7.40-7.36 (m, 2H), 6.95 (s, 1H), 6.56 (t, 3=5.7 Hz, 1H), 5.52 (s, 2H), 3.19 (q, 3=6.6 Hz, 2H), 3.01 (q, 3=7.5 Hz, 2H), 2.72 (d, 3=7.0 Hz, 2H), 2.32 (tq, 3=11.5, 6.8, 5.7 Hz, 2H), 1.88 (dp, 3=13.5, 6.7 Hz, 1H), 1.24 (t, 3=7.5 Hz, 3H), 0.93 (d, 3=6.6 Hz, 6H).

MS (M+H$^+$): experimental 561 calculated 561.

Example 31

1-[(3-{4-[(2-ethyl-1H-imidazol-1-yl)methyl]-3-fluorophenyl}-5-(2-methylpropyl)thiophen-2-yl)sulfonyl]-3-(2-methoxyethyl)urea trifluoroacetic acid The title compound was prepared as described in Example 30, using 2-methoxyethylamine in the final step. The amount of title compound that was isolated was 34 mg (71%). HPLC purity (220 nm): >95%.

$^1$H-NMR (400 MHz, DMSO-d6) δ 7.68-7.64 (m, 2H), 7.48 (d, 3=11.2 Hz, 1H), 7.41-7.37 (m, 2H), 6.95 (s, 1H), 6.34 (t, 3=5.1 Hz, 1H), 5.52 (s, 2H), 3.25 (t, 3=5.5 Hz, 2H), 3.21 (s, 3H), 3.09 (q, 3=5.4 Hz, 2H), 3.01 (q, 3=7.5 Hz, 2H), 2.72 (d, 3=7.0 Hz, 2H), 1.89 (dp, 3=13.5, 6.6 Hz, 1H), 1.24 (t, 3=7.5 Hz, 3H), 0.93 (d, 3=6.6 Hz, 6H).

MS (M+H$^+$): experimental 523 calculated 523.

Example 32

3-[(3-{4-[(2-ethyl-1H-imidazol-1-yl)methyl]-3-fluorophenyl}-5-(2-methylpropyl)thiophen-2-yl)sulfonyl]-1-[(4-fluorophenyl)methyl] urea trifluoroacetic acid The title compound was prepared as described in Example 30, using 4-fluorobenzylamine in the final step. The amount of title compound that was isolated was 36 mg (70%). HPLC purity (220 nm): >95%.

$^1$H-NMR (400 MHz, DMSO-d6) δ 7.66-7.60 (m, 2H), 7.48 (d, 3=11.2 Hz, 1H), 7.42-7.36 (m, 2H), 7.17-7.07 (m, 4H), 6.96 (s, 1H), 6.85 (t, 3=5.8 Hz, 1H), 5.51 (s, 2H), 4.12 (d, 3=5.9 Hz, 2H), 2.98 (q, 3=7.5 Hz, 2H), 2.71 (d, 3=7.0 Hz, 2H), 1.87 (dp, 3=13.3, 6.5 Hz, 1H), 1.21 (t, 3=7.5 Hz, 3H), 0.93 (d, 3=6.6 Hz, 6H).

MS (M+H$^+$): experimental 573 calculated 573.

Example 33

1-[(3-{4-[(2-ethyl-1H-imidazol-1-yl)methyl]-3-fluorophenyl}-5-(2-methylpropyl)thiophen-2-yl)sulfonyl]-3-propylurea trifluoroacetic acid The title compound was prepared as described in Example 30, using propylamine in the final step. The amount of title compound that was isolated was 33 mg (71%). HPLC purity (220 nm): >95%.

$^1$H-NMR (400 MHz, DMSO-d6) δ 7.66-7.63 (m, 2H), 7.47 (d, 3=11.3 Hz, 1H), 7.41-7.36 (m, 2H), 6.95 (s, 1H), 6.31 (t, 3=5.5 Hz, 1H), 5.51 (s, 2H), 3.00 (q, 3=7.5 Hz, 2H), 2.88 (q, 3=6.6 Hz, 2H), 2.72 (d, 3=7.0 Hz, 2H), 1.88 (dp, 3=13.4, 6.7 Hz, 1H), 1.33-1.21 (m, 5H), 0.93 (d, 3=6.6 Hz, 6H), 0.73 (t, 3=7.4 Hz, 3H).

MS (M+H$^+$): experimental 507 calculated 507.

Example 34

1-[(3,4-difluorophenyl)methyl]-3-[(3-{3-fluoro-4-[(2-methyl-1H-imidazol-1-yl)methyl]phenyl}-5-(2-methylpropyl)thiophen-2-yl)sulfonyl]urea trifluoroacetic acid The title compound was prepared as described in Example 30, using 1-[(4-bromo-2-fluorophenyl)methyl]-2-methylimidazole in the first step and 3,4-difluorobenzylamine in the final step. The amount of title compound that was isolated was 27 mg (39%). HPLC purity (220 nm): >95%.

$^1$H-NMR (400 MHz, DMSO-d6) δ 7.62-7.60 (m, 2H), 7.46 (d, 3=11.1 Hz, 1H), 7.43-7.30 (m, 3H), 7.17-7.09 (m, 1H), 7.00 (t, 3=6.0 Hz, 1H), 6.98-6.93 (m, 2H), 5.48 (s, 2H), 4.12 (d, 3=5.9 Hz, 2H), 2.71 (d, 3=7.0 Hz, 2H), 2.60 (s, 3H), 1.87 (dp, 3=13.4, 6.7 Hz, 1H), 0.92 (d, 3=6.6 Hz, 6H).

MS (M+H$^+$): experimental 577 calculated 577.

Example 35

1-[(3-{3-fluoro-4-[(2-methyl-1H-imidazol-1-yl)methyl]phenyl}-5-(2-methylpropyl)thiophen-2-yl)sulfonyl]-3-[(thiophen-2-yl)methyl]urea trifluoroacetic acid The title compound was prepared as described in Example 30, using 1-[(4-bromo-2-fluorophenyl)methyl]-2-methylimidazole in the first step and 2-aminomethylthiophene in the final step. The amount of title compound that was isolated was 40 mg (60%). HPLC purity (220 nm): >95%.

$^1$H-NMR (400 MHz, DMSO-d6) δ 10.98 (s, 1H), 7.63-7.60 (m, 2H), 7.45 (d, 3=11.1 Hz, 1H), 7.40-7.33 (m, 3H), 6.95 (s, 1H), 6.94-6.84 (m, 3H), 5.48 (s, 2H), 4.30 (d, 3=5.8 Hz, 2H), 2.72 (d, 3=7.0 Hz, 2H), 2.60 (s, 3H), 1.88 (dp, 3=13.4, 6.5 Hz, 1H), 0.94 (d, 3=6.6 Hz, 6H).

MS (M+H$^+$): experimental 547 calculated 547.

Example 36

1-[(3-{3-fluoro-4-[(2-methyl-1H-imidazol-1-yl)methyl]phenyl}-5-(2-methylpropyl)thiophen-2-yl)sulfonyl]-3-propylurea trifluoroacetic acid The title compound was prepared as described in Example 30, using 1-[(4-bromo-2-fluorophenyl)methyl]-2-methyl-imidazole in the first step and propylamine in the final step. The amount of title compound that was isolated was 33 mg (54%). HPLC purity (220 nm): >95%.

$^1$H-NMR (400 MHz, DMSO-d6) δ 10.72 (s, 1H), 7.65-7.61 (m, 2H), 7.49-7.35 (m, 3H), 6.95 (s, 1H), 6.31 (t, 3=5.4 Hz, 1H), 5.49 (s, 2H), 2.87 (q, 3=6.6 Hz, 2H), 2.72 (d, 3=7.0 Hz, 2H), 2.63 (s, 3H), 1.88 (dp, 3=13.4, 6.7 Hz, 1H), 1.28 (h, 3=7.2 Hz, 2H), 0.93 (d, 3=6.6 Hz, 6H), 0.72 (t, 3=7.4 Hz, 3H).

MS (M+H$^+$): experimental 493 calculated 493.

Example 37

1-[(3-{3-fluoro-4-[(2-methyl-1H-imidazol-1-yl)methyl]phenyl}-5-(2-methylpropyl)thiophen-2-yl)sulfonyl]-3-(3,3,3-trifluoropropyl)urea trifluoroacetic acid The title compound was prepared as described in Example 30, using 1-[(4-bromo-2-fluorophenyl)methyl]-2-methyl-imidazole in the first step and 3,3,3-trifluoropropylamine hydrochloride in the final step. The amount of title compound that was isolated was 22 mg (67%). HPLC purity (220 nm): >95%.

$^1$H-NMR (400 MHz, DMSO-d6) δ 7.65-7.60 (m, 2H), 7.49-7.36 (m, 3H), 6.95 (s, 1H), 6.44 (t, 3=6.0 Hz, 1H), 5.49 (s, 2H), 3.20 (q, 3=6.5 Hz, 2H), 2.72 (d, 3=7.0 Hz, 2H), 2.62 (s, 3H), 2.32 (tq, 3=11.9, 7.1, 5.9 Hz, 2H), 1.88 (dt, 3=13.4, 6.9 Hz, 1H), 0.93 (d, 3=6.6 Hz, 6H).

MS (M+H$^+$): experimental 547 calculated 547.

Example 38

1-[(4-chloropyridin-2-yl)methyl]-3-[(3-{3-fluoro-4-[(2-methyl-1H-imidazol-1-yl)methyl]phenyl}-5-(2-methylpropyl)thiophen-2-yl)sulfonyl]urea trifluoroacetic acid The title compound was prepared as described in Example 30, using 1-[(4-bromo-2-fluorophenyl)methyl]-2-methyl-imidazole in the first step and 4-chloro-2-pyridinemethanamine in the final step. The amount of title compound that was isolated was 34 mg (66%). HPLC purity (220 nm): >95%.

$^1$H-NMR (400 MHz, DMSO-d6) δ 8.47 (d, 3=5.4 Hz, 1H), 7.64-7.60 (m, 2H), 7.49 (d, 3=11.1 Hz, 1H), 7.45-7.36 (m, 3H), 7.26-7.25 (m, 1H), 7.03 (t, 3=5.5 Hz, 1H), 6.96 (s, 1H), 5.48 (s, 2H), 4.28 (d, 3=5.6 Hz, 2H), 2.71 (d, 3=7.0 Hz, 2H), 2.61 (s, 3H), 1.87 (dp, 3=13.5, 6.8 Hz, 1H), 0.92 (d, 3=6.6 Hz, 6H).

MS (M+H$^+$): experimental 576 calculated 576.

Example 39

1-[(3-{3-fluoro-4-[(2-methyl-1H-imidazol-1-yl)methyl]phenyl}-5-(2-methylpropyl)thiophen-2-yl)sulfonyl]-3-(2-methylpropyl)urea trifluoroacetic acid The title compound was prepared as described in Example 30, using 1-[(4-bromo-2-fluorophenyl)methyl]-2-methyl-imidazole in the first step and isobutylamine in the final step. The amount of title compound that was isolated was 30 mg (64%). HPLC purity (220 nm): >95%.

$^1$H-NMR (400 MHz, DMSO-d6) δ 7.66-7.61 (m, 2H), 7.49-7.36 (m, 3H), 6.96 (s, 1H), 6.29 (t, 3=5.5 Hz, 1H), 5.49 (s, 2H), 2.77-2.70 (m, 4H), 2.63 (s, 3H), 1.88 (dp, 3=13.4, 6.7 Hz, 1H), 1.53 (dp, 3=13.5, 6.8 Hz, 1H), 0.93 (d, 3=6.6 Hz, 6H), 0.71 (d, 3=6.7 Hz, 6H).

MS (M+H$^+$): experimental 507 calculated 507.

Example 40

1-[(4,4-difluorocyclohexyl)methyl]-3-[(3-{3-fluoro-4-[(2-methyl-1H-imidazol-1-yl)methyl]phenyl}-5-(2-methylpropyl)thiophen-2-yl)sulfonyl]urea trifluoroacetic acid The title compound was prepared as described in Example 30, using 1-[(4-bromo-2-fluorophenyl)methyl]-2-methyl-imidazole in the first step and (4,4-difluorocyclohexyl)methanamine in the final step. The amount of title compound that was isolated was 44 mg (84%). HPLC purity (220 nm): >95%.

$^1$H-NMR (400 MHz, DMSO-d6) δ 7.63 (d, 3=1.6 Hz, 2H), 7.47 (d, 3=11.1 Hz, 1H), 7.45-7.36 (m, 2H), 6.96 (s, 1H), 6.46 (t, 3=5.5 Hz, 1H), 5.48 (s, 2H), 2.85 (t, 3=6.3 Hz, 2H), 2.72 (d, 3=7.0 Hz, 2H), 2.63 (s, 3H), 1.99-1.37 (m, 8H), 1.03 (q, 3=10.4 Hz, 2H), 0.93 (d, 3=6.6 Hz, 6H).

MS (M+H$^+$): experimental 583 calculated 583.

Example 41

1-{[3-(3-fluoro-4-{[2-(propan-2-yl)-1H-imidazol-1-yl]methyl}phenyl)-5-(2-methylpropyl)thiophen-2-yl]sulfonyl}-3-(3,3,3-trifluoropropyl)urea trifluoroacetic acid The title compound was prepared as described in Example 30, using 1-[(4-bromo-2-fluorophenyl)methyl]-2-(propan-2-yl)-imidazole (prepared using procedures similar to literature for 1-[(4-bromophenyl)methyl]-2-methyl-imidazole (see e.g. international patent application WO 2002/096883)) in the first step and 3,3,3-trifluoropropylamine hydrochloride in the final step. The amount of title compound that was isolated was 28 mg (54%). HPLC purity (220 nm): >95%.

$^1$H-NMR (400 MHz, DMSO-d6) δ 7.71 (d, 3=1.9 Hz, 1H), 7.64 (d, 3=1.8 Hz, 1H), 7.48 (d, 3=11.6 Hz, 1H), 7.42-7.34 (m, 2H), 6.96 (s, 1H), 6.54 (t, 3=5.8 Hz, 1H), 5.57 (s, 2H), 3.55 (dt, 3=13.8, 6.9 Hz, 1H), 3.20 (q, 3=6.6 Hz, 2H), 2.72 (d, 3=7.0 Hz, 2H), 2.34 (ddt, 3=17.9, 11.4, 5.7 Hz, 2H), 1.88 (dp, 3=13.4, 6.6 Hz, 1H), 1.26 (d, 3=6.9 Hz, 6H), 0.93 (d, 3=6.6 Hz, 6H).

MS (M+H$^+$): experimental 575 calculated 575.

Example 42

1-{[3-(3-fluoro-4-{[2-(propan-2-yl)-1H-imidazol-1-yl]methyl}phenyl)-5-(2-methylpropyl)thiophen-2-yl]sulfonyl}-3-(4,4,4-trifluorobutyl)urea trifluoroacetic acid The title compound was prepared as described in Example 30, using 1-[(4-bromo-2-fluorophenyl)methyl]-2-(propan-2-yl)-imidazole in the first step and 3,3,3-trifluorobutylamine hydrochloride in the final step. The amount of title compound that was isolated was 32 mg (61%). HPLC purity (220 nm): >95%.

¹H-NMR (400 MHz, DMSO-d6) δ 7.71 (d, 3=1.9 Hz, 1H), 7.64 (d, 3=1.8 Hz, 1H), 7.48 (d, 3=11.6 Hz, 1H), 7.41-7.34 (m, 2H), 6.96 (s, 1H), 6.52 (t, 3=5.6 Hz, 1H), 5.57 (s, 2H), 3.55 (dt, 3=13.9, 6.9 Hz, 1H), 3.01 (q, 3=6.5 Hz, 2H), 2.71 (d, 3=7.0 Hz, 2H), 2.19-2.04 (m, 2H), 1.88 (dp, 3=13.6, 6.7 Hz, 1H), 1.51 (p, 3=7.2 Hz, 2H), 1.26 (d, 3=6.9 Hz, 6H), 0.93 (d, 3=6.6 Hz, 6H).

MS (M+H⁺): experimental 589 calculated 589.

Example 43

1-{[3-(3-fluoro-4-{[2-(propan-2-yl)-1H-imidazol-1-yl]methyl}phenyl)-5-(2-methylpropyl)thiophen-2-yl]sulfonyl}-3-propylurea trifluoroacetic acid The title compound was prepared as described in Example 30, using 1-[(4-bromo-2-fluorophenyl)methyl]-2-(propan-2-yl)-imidazole in the first step and propylamine in the final step. The amount of title compound that was isolated was 17 mg (36%). HPLC purity (220 nm): >95%.

¹H-NMR (400 MHz, DMSO-d6) δ 7.70 (d, 3=1.5 Hz, 1H), 7.63 (d, 3=1.6 Hz, 1H), 7.48 (d, 3=11.6 Hz, 1H), 7.38 (d, 3=6.1 Hz, 2H), 6.95 (s, 1H), 6.28 (t, 3=5.1 Hz, 1H), 5.57 (s, 2H), 3.54 (p, 3=7.0 Hz, 1H), 2.88 (q, 3=6.7 Hz, 2H), 2.72 (d, 3=7.0 Hz, 2H), 1.88 (dp, 3=13.4, 6.7 Hz, 1H), 1.28 (dd, 3=13.6, 7.0 Hz, 8H), 0.93 (d, 3=6.6 Hz, 6H), 0.74 (t, 3=7.4 Hz, 3H).

MS (M+H⁺): experimental 521 calculated 521.

Example 44

Further Compounds

The following compounds are prepared using similar methods to those disclosed in one or more of the above examples:

1-(3-{3-fluoro-4-[(2-methyl-1H-imidazol-1-yl)methyl]phenyl}-5-isobutyl-2-thienylsulfonyl)-3-propoxyurea, 3-(3-{3-fluoro-4-[(2-methyl-1H-imidazol-1-yl)methyl]phenyl}-5-(2,2,2-trifluoroethyl)-2-thienylsulfonyl)-1-(3,3,3-trifluoropropyl)urea, and 3-(3-{3,5-fifluoro-4-[(2-methyl-1H-imidazol-1-yl)methyl]phenyl}-5-isobutyl-2-thienylsulfonyl)-1-(3,3,3-trifluoropropyl)urea.

Biological Assays

The biological activity of example compounds as described herein above was assessed using the following biological assays.

Metabolic Stability

Pooled human liver microsomes in PBS at a concentration of 0.5 mg/ml was incubated with or without 1 mM NADPH for 70 min at 37° C. Test compound was added after 10 minutes to a final concentration of 1 μM. Samples were withdrawn at 0, 5, 15 and 60 minutes and added to test tubes containing acetonitrile, to stop the reaction, and with terfenadine, used as internal standard. After centrifugation at 10 000×g for 5 minutes the supernatant was diluted 1:1 with 1% formic acid. Samples were separated on a reverse phase column and detected by triple quadrupole MSMS (Agilant model 6540). The concentration of the parent compound at the different time points was measured with an external standard curve using terfenadine as internal standard and the initial metabolic rate in the presence or absence of NADPH calculated.

| | $T_{1/2}$, no NaDPH [min] | $T_{1/2}$, + NaDPH [min] |
|---|---|---|
| Example 1 | >60 | 24 |
| Example 2 | >60 | >60 |
| Example 3 | >60 | >60 |
| Example 4 | >60 | 39 |
| Example 5 | >60 | 25 |
| Example 6 | >60 | 24 |
| Example 7 | >60 | >60 |
| Example 8 | >60 | 46 |
| Example 9 | >60 | >60 |
| Example 13 | >60 | >60 |
| Example 14 | >60 | 90 |
| Example 15 | >60 | >60 |
| Example 18 | >60 | 30 |
| Example 25 | >60 | 60 |
| Example 26 | >60 | >60 |
| Example 28 | >60 | >60 |
| Example 30 | >60 | 40 |
| Example 32 | >60 | 7 |
| Example 33 | >60 | >60 |
| Example 34 | >60 | 6 |
| Example 35 | >60 | 45 |
| Example 38 | >60 | 27 |
| Example 39 | >60 | 60 |
| Example 40 | >60 | 4 |
| Example 41 | >60 | 43 |
| C21 | 31 | 35 |

Binding to AT1 and AT2 receptor

Compounds were evaluated for binding to the human recombinant AT2 and AT1 receptor according to Eurofins protocol ITEM26 and ITEM24 using a radiometric scintillation assay.

Briefly, recombinant protein was incubated for 2-4 h at 37° C. with test compounds at concentration 1,10,100 and 1000 nM for the AT2 receptor and 1 and 10 μM for the AT1 receptor. ¹²⁵I(sar1,Ile8)-AT-II was used as a ligand for the AT1 receptor and ¹²⁵ICGP 42112A was used as a ligand for the AT2 receptor. Percent inhibition of control specific binding was calculated according to 100−(measured specific binding/control specific binding)×100.

| | AT2 IC$_{50}$ [nM] | AT1 IC$_{50}$ [nM] |
|---|---|---|
| Example 1 | 4 | >1000 |
| Example 2 | 5.5 | >10000 |
| Example 3 | 14.6 | >10000 |
| Example 4 | 10.5 | >10000 |
| Example 5 | 14.8 | >10000 |
| Example 6 | 3.5 | >1000 |
| Example 7 | 15.2 | >10000 |
| Example 8 | 82 | >10000 |
| Example 9 | 4.2 | 10000 |
| Example 10 | 90.6 | 6000 |
| Example 11 | 119 | 18000 |
| Example 12 | 2.1 | 10000 |
| Example 13 | 0.53 | 26000 |
| Example 14 | 3.3 | 25000 |
| Example 15 | 4.9 | 463000 |
| Example 16 | 7.4 | 57000 |
| Example 17 | 9.5 | 58000 |
| Example 18 | 3.2 | 13000 |
| Example 19 | 127 | 83000 |
| Example 20 | 31.7 | 226000 |
| Example 21 | 15.5 | 69000 |
| Example 22 | 16.9 | 51000 |
| Example 23 | 357 | 16000 |
| Example 24 | 2.2 | 39000 |
| Example 25 | 2.5 | 30000 |
| Example 26 | 25 | — |
| Example 27 | 61 | — |
| Example 28 | 32 | — |
| Example 29 | 33 | — |
| Example 30 | 7.1 | 11000 |

|         | AT2 IC$_{50}$ [nM] | AT1 IC$_{50}$ [nM] |
|---------|-------|-------|
| Example 31 | 5.7   | 11000 |
| Example 32 | 1.6   | 5000  |
| Example 33 | 5.1   | 19000 |
| Example 34 | 5.2   | 21000 |
| Example 35 | 0.63  | 8000  |
| Example 36 | 6.3   | 40000 |
| Example 38 | 16.6  | 25000 |
| Example 39 | 8.6   | 16000 |
| Example 40 | 7.7   | 17000 |
| Example 41 | 4.9   | 4000  |
| Example 42 | 2.9   | 5000  |
| Example 43 | 10.0  | 4000  |
| C21        | 5.1   | >10000 |

CYP Inhibition

Compounds were evaluated at 10 μM for inhibition of the main cytochrome P450 isoforms (CYP1A, CYP2B6, CYP2C8, CYP2C9, CYP2C19, CYP2D6 and CYP3A4 and CYP3A4&5) using isoform-specific substrates incubated with human liver microsomes (Eurofins protocol ITEMG232). The following substrates were used: CYP1A phenacetin, CYP2B6 bupropion, CYP2C8 paclitaxel and amodiaquine, CYP2C9 diclofenac, CYP2C19 omeprazole, CYP2D6 dextromethorphan, CYP3A midazolam and testosterone.

At the end of the incubation, the formation of metabolite was monitored by HPLC-MS/MS as the peak area response.

|            | CYP1A Inh % | CYP2B6 Inh % | CYP2C19 Inh % | CYP2C8 Inh % | CYP2C9 Inh % | CYP2D6 Inh % |
|------------|-------------|--------------|---------------|--------------|--------------|--------------|
| Example 1  | 7.3   | 19.0  | 59.1  | 40.0 | 49.7 | 14.3 |
| Example 2  | 5.0   | 8.2   | 35.4  | 52.8 | 30.4 | 8.6  |
| Example 3  | -4.2  | 9.9   | 37.3  | 25.3 | 21.6 | 5.5  |
| Example 4  | 10.5  | 12.7  | 37.5  | 47.2 | 31.3 | 7.7  |
| Example 5  | 7.3   | 9.6   | 50.4  | 49.3 | 27.9 | 13.2 |
| Example 6  | 6.8   | 18.1  | 57.0  | 76.2 | 51.4 | 27.3 |
| Example 7  | 10.6  | -0.4  | 37.9  | 38.6 | 10.2 | 3.2  |
| Example 8  | 21.2  | 18.8  | 95.8  | 60.2 | 24.0 | 0.0  |
| Example 9  | -9    | 0     | 18    | 52   | 28   | 24   |
| Example 10 | -5    | 15    | 61    | 48   | 50   | 31   |
| Example 11 | 5     | 14    | 53    | 34   | 29   | 44   |
| Example 12 | 4     | 33    | 62    | 51   | 64   | 58   |
| Example 13 | 16    | 3     | 40    | 77   | 32   | 12   |
| Example 14 | 13    | 43    | 62    | 78   | 65   | 30   |
| Example 15 | 20    | 63    | 73    | 48   | 30   | 53   |
| Example 16 | 23    | 88    | 91    | 65   | 79   | 88   |
| Example 17 | 29    | 20    | 54    | 83   | 48   | 22   |
| Example 18 | 15    | 59    | 78    | 72   | 62   | 20   |
| Example 25 | 8     | 23    | 56    | 56   | 50   | 16   |
| Example 30 | -1    | 30    | 53    | 64   | 61   | 12   |
| Example 32 | -26   | 25    | 67    | 65   | 49   | 39   |
| Example 33 | 14    | 37    | 26    | 69   | 34   | 18   |
| Example 34 | -6    | 57    | 80    | 64   | 75   | 40   |
| Example 35 | 20    | 46    | 60    | 56   | 71   | 45   |
| Example 38 | 13    | 25    | 58    | 62   | 48   | 19   |
| Example 39 | -2    | 28    | 56    | 51   | 44   | 10   |
| Example 40 | -1    | 54    | 80    | 64   | 70   | 47   |
| Example 41 | 5     | 30    | 53    | 76   | 58   | 12   |
| C21        | 90.9  | 48.8  | 96.0  | 80.4 | 99.0 | 81.2 |

|            | CYP3A4 midazolam Inh % | CYP3A4&5 testosterone Inh % |
|------------|------------------------|------------------------------|
| Example 1  | 41.3 | 21.4 |
| Example 2  | 22.1 | 0.3  |
| Example 3  | 4.1  | 8.2  |
| Example 4  | 17.1 | 8.2  |
| Example 5  | 26.7 | 14.7 |
| Example 6  | 28.5 | 13.2 |
| Example 7  | 10.1 | 3.0  |
| Example 8  | 17.5 | 29.8 |
| Example 9  | -19  | 17   |
| Example 10 | 25   | 29   |
| Example 11 | 22   | 17   |
| Example 12 | 32   | 24   |
| Example 13 | 80   | 9    |
| Example 14 | 30   | 33   |
| Example 15 | 38   | 12   |
| Example 16 | 91   | 58   |
| Example 17 | 65   | 18   |
| Example 18 | 50   | 24   |
| Example 25 | 16   | 15   |
| Example 30 | -3   | 13   |
| Example 32 | 35   | 10   |
| Example 33 | -37  | 11   |
| Example 34 | 74   | 60   |
| Example 35 | 26   | 25   |
| Example 38 | 22   | 13   |
| Example 39 | 18   | 27   |
| Example 40 | 85   | 63   |
| Example 41 | -5   | 10   |
| C21        | 95.2 | 94.2 |

Abbreviations

The following abbreviations may be used herein.
DMSO dimethylsulfoxide
DCM dichloromethane
EtOAc ethylacetate
MeOH methanol
NMR nuclear magnetic resonance
TFA trifluoroacetic acid

The invention claimed is:
1. A compound of formula I,
wherein:

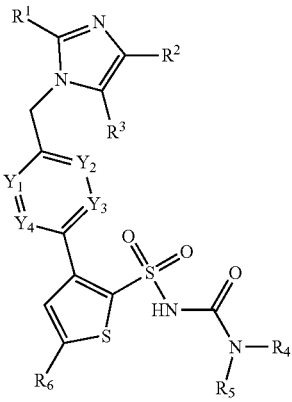

R¹ represents $C_{1-6}$ alkyl, optionally substituted by one or more halogen atoms;
R² and R³ independently represent H or $C_{1-6}$ alkyl, optionally substituted by one or more halogen atoms;
$Y^1$, $Y^2$, $Y^3$ and $Y^4$ independently represent —CH—, —CF— or —N—;
R⁴ represents $C_{1-7}$ alkyl, $C_{1-6}$ alkoxy, $C_{1-6}$ alkoxy-$C_{1-6}$ alkyl, each of which are optionally substituted with one or more halogen atoms, or
R⁴ represents aryl, $C_{1-6}$ alkylaryl, $C_{1-3}$ alkenylaryl, heteroaryl, $C_{1-6}$ alkylheteroaryl or $C_{1-3}$ alkenylheteroaryl, each of which are optionally substituted by one or more substituents selected from halogen, $CF_3$, $CF_3O$, $C_{1-6}$ alkyl, and $C_{1-6}$ alkoxy;
R⁵ represents H or $C_{1-6}$ alkyl, optionally substituted by one or more halogen atoms; and
R⁶ represents $C_{1-6}$ alkyl, $C_{1-6}$ alkoxy, $C_{1-6}$ alkoxy-$C_{1-6}$ alkyl, each of which are optionally substituted by one or more halogen atoms,
or a pharmaceutically-acceptable salt thereof.

2. A compound as claimed in claim 1, wherein R¹ represents $C_{1-3}$ alkyl group, optionally substituted by up to three fluorine atoms.

3. A compound as claimed in claim 1, wherein R² and R³ independently represent H, methyl or ethyl.

4. A compound as claimed in claim 1, wherein R⁴ represents a $C_{1-4}$ alkyl group, optionally substituted or terminated by up to three fluorine atoms; or a $C_{1-2}$ alkoxy-$C_{1-3}$ alkyl group, optionally substituted or terminated by up to three fluorine atoms; phenyl; $C_{1-3}$ alkylaryl; or $C_{1-3}$ alkylheteroaryl.

5. A compound as claimed in claim 1, wherein R⁵ represents H or a $C_{1-4}$ alkyl group.

6. A compound as claimed in claim 1, wherein R⁶ represents a $C_{1-4}$ alkyl group, optionally substituted by up to three fluorine atoms.

7. A compound as claimed in claim 1, wherein $Y^1$ represents —CH—, —CF— or —N—; $Y^2$ represents —CH— or —CF—; $Y^3$ represents —CH—; and/or $Y^4$ represents —CH— or —N—.

8. A compound as claimed in claim 7, wherein $Y^1$ represents —CH— or —CF; and/or $Y^2$, $Y^3$ and $Y^4$ all represent —CH—.

9. A compound as claimed in claim 1, which is:
1-benzyl-3-(5-isobutyl-3-{p-[(2-methyl-1H-imidazol-1-yl)methyl]phenyl}-2 thienylsulfonyl)urea,
3-(5-isobutyl-3-{p-[(2-methyl-1H-imidazol-1-yl)methyl]phenyl}-2-thienylsulfonyl)-1-[(2-pyridyl)methyl]urea,
3-(5-isobutyl-3-{p-[(2-methyl-1H-imidazol-1-yl)methyl]phenyl}-2-thienylsulfonyl)-1-(3,3,3-trifluoropropyl)urea,
1-butyl-3-(5-isobutyl-3-{p-[(2-methyl-1H-imidazol-1-yl)methyl]phenyl}-2-thienylsulfonyl)urea,
3-(5-isobutyl-3-{p-[(2-methyl-1H-imidazol-1-yl)methyl]phenyl}-2-thienylsulfonyl)-1-(4,4,4-trifluorobutyl)urea,
1-benzyl-3-(3-{p-[(2-ethyl-1H-imidazol-1-yl)methyl]phenyl}-5-isobutyl-2-thienylsulfonyl)urea,
3-(3-{p-[(2-ethyl-1H-imidazol-1-yl)methyl]phenyl}-5-isobutyl-2-thienylsulfonyl)-1-(2-methoxyethyl)urea,
3-(3-{p-[(2,4-dimethyl-1H-imidazol-1-yl)methyl]phenyl}-5-isobutyl-2-thienylsulfonyl)-1-(3,3,3-trifluoropropyl)urea,
3-(3-{p-[(2-ethyl-1H-imidazol-1-yl)methyl]phenyl}-5-isobutyl-2-thienylsulfonyl)-1-[(2-pyridyl)methyl]urea,
1-benzyl-3-(3-{p-[(2,4-dimethyl-1H-imidazol-1-yl)methyl]phenyl}-5-isobutyl-2-thienylsulfonyl)urea,
3-(3-{p-[(2,4-dimethyl-1H-imidazol-1-yl)methyl]phenyl}-5-isobutyl-2-thienylsulfonyl)-1-[(2-pyridyl)methyl]urea,
1-benzyl-3-(3-{3-fluoro-4-[(2-methyl-1H-imidazol-1-yl)methyl]phenyl}-5-isobutyl-2-thienylsulfonyl)urea,
3-(3-{3-fluoro-4-[(2-methyl-1H-imidazol-1-yl)methyl]phenyl}-5-isobutyl-2-thienylsulfonyl)-1-[(2-pyridyl)methyl]urea,
3-(3-{3-fluoro-4-[(2-methyl-1H-imidazol-1-yl)methyl]phenyl}-5-isobutyl-2-thienylsulfonyl)-1-(3,3,3-trifluoropropyl)urea,
1-(3-{3-fluoro-4-[(2-methyl-1H-imidazol-1-yl)methyl]phenyl}-5-isobutyl-2-thienylsulfonyl)-3-[(1-methyl-1H-imidazol-2-yl)methyl]urea,
1-(3-{3-fluoro-4-[(2-methyl-1H-imidazol-1-yl)methyl]phenyl}-5-isobutyl-2-thienylsulfonyl)-3-[2-(1H-imidazol-4-yl)ethyl]urea,
3-(3-{3-fluoro-4-[(2-methyl-1H-imidazol-1-yl)methyl]phenyl}-5-isobutyl-2-thienylsulfonyl)-1-methyl-1-[(2-pyridyl)methyl]urea,
3-(3-{3-fluoro-4-[(2-methyl-1H-imidazol-1-yl)methyl]phenyl}-5-isobutyl-2-thienylsulfonyl)-1-(4,4,4-trifluorobutyl)urea,
3-(5-isobutyl-3-{5-[(2-methyl-1H-imidazol-1-yl)methyl]-2-pyridyl}-2-thienylsulfonyl)-1-(3,3,3-trifluoropropyl)urea,
3-(5-isobutyl-3-{2-[(2-methyl-1H-imidazol-1-yl)methyl]-5-pyrimidinyl}-2-thienylsulfonyl)-1-(2-methoxyethyl)urea,
3-(5-isobutyl-3-{2-[(2-methyl-1H-imidazol-1-yl)methyl]-5-pyrimidinyl}-2-thienylsulfonyl)-1-(3,3,3-trifluoropropyl)urea,
3-(5-isobutyl-3-{2-[(2-methyl-1H-innidazol-1-yl)methyl]-5-pyrimidinyl}-2-thienylsulfonyl)-1-[(2-pyridyl)methyl]urea,
1-[(3,5-difluorophenyl)methyl]-3-(5-isobutyl-3-{5-[(2-methyl-1H-imidazol-1-yl)methyl]-2-pyridyl}-2-thienylsulfonyl)urea,
3-(3-{3-fluoro-4-[(2-methyl-1H-innidazol-1-yl)methyl]phenyl}-5-isobutyl-2-thienylsulfonyl)-1-(2-methoxyethyl)urea,
3-(3-{3-fluoro-4-[(2-methyl-1H-innidazol-1-yl)methyl]phenyl}-5-isobutyl-2-thienylsulfonyl)-1-[1-(2-pyridyl)ethyl]urea,
3-(3-{2-fluoro-4-[(2-methyl-1H-innidazol-1-yl)methyl]phenyl}-5-isobutyl-2-thienylsulfonyl)-1-(3,3,3-trifluoropropyl)urea, 3-(3-{2-fluoro-4-[(2-methyl-1H-innidazol-1-yl)methyl]phenyl}-5-isobutyl-2-thienylsulfonyl)-1-(2,2,2-trifluoroethyl)urea,
1-(3-fluoropropyl)-3-(5-isobutyl-3-{p-[(2-methyl-1H-innidazol-1-yl)methyl]phenyl}-2-thienylsulfonyl)urea,
1-(3,3-difluoropropyl)-3-(5-isobutyl-3-{p-[(2-methyl-1H-imidazol-1-yl)methyl]phenyl}-2-thienylsulfonyl)urea,
1-[(3-{4-[(2-ethyl-1H-innidazol-1-yl)methyl]-3-fluorophenyl}-5-(2-methylpropyl)thiophen-2-yl)sulfonyl]-3-(3,3,3-trifluoropropyl)urea,
1-[(3-{4-[(2-ethyl-1H-innidazol-1-yl)methyl]-3-fluorophenyl}-5-(2-methylpropyl)thiophen-2-yl)sulfonyl]-3-(2-methoxyethyl)urea,
3-[(3-{4-[(2-ethyl-1H-innidazol-1-yl)methyl]-3-fluorophenyl}-5-(2-methylpropyl)thiophen-2-yl)sulfonyl]-1-[(4-fluorophenyl)methyl]urea,
1-[(3-{4-[(2-ethyl-1H-innidazol-1-yl)methyl]-3-fluorophenyl}-5-(2-methylpropyl)thiophen-2-yl)sulfonyl]-3-propylurea,
1-[(3,4-difluorophenyl)methyl]-3-[(3-{3-fluoro-4-[(2-methyl-1H-imidazol-1-yl)methyl]phenyl}-5-(2-methylpropyl)thiophen-2-yl)sulfonyl]urea,
1-[(3-{3-fluoro-4-[(2-methyl-1H-innidazol-1-yl)methyl]phenyl}-5-(2-methylpropyl)thiophen-2-yl)sulfonyl]-3-[(thiophen-2-yl)methyl]urea,
1-[(3-{3-fluoro-4-[(2-methyl-1H-innidazol-1-yl)methyl]phenyl}-5-(2-methylpropyl)thiophen-2-yl)sulfonyl]-3-propylurea,
1-[(3-{3-fluoro-4-[(2-methyl-1H-innidazol-1-yl)methyl]phenyl}-5-(2-methylpropyl)thiophen-2-yl)sulfonyl]-3-(3,3,3-trifluoropropyl)urea,
1-[(4-chloropyridin-2-yl)methyl]-3-[(3-{3-fluoro-4-[(2-methyl-1H-imidazol-1-yl)methyl]phenyl}-5-(2-methylpropyl)thiophen-2-yl)sulfonyl]urea,
1-[(3-{3-fluoro-4-[(2-methyl-1H-innidazol-1-yl)methyl]phenyl}-5-(2-methylpropyl)thiophen-2-yl)sulfonyl]-3-(2-methylpropyl)urea,
1-[(4,4-difluorocyclohexyl)methyl]-3-[(3-{3-fluoro-4-[(2-methyl-1H-imidazol-1-yl)methyl]phenyl}-5-(2-methylpropyl)thiophen-2-yl)sulfonyl]urea,
1-{[3-(3-fluoro-4{[2-(propan-2-yl)-1H-imidazol-1-yl]methyl}phenyl)-5-(2-methylpropyl)thiophen-2-yl]sulfonyl}-3-(3,3,3-trifluoropropyl)urea,
1-{[3-(3-fluoro-4{[2-(propan-2-yl)-1H-imidazol-1-yl]methyl}phenyl)-5-(2-methylpropyl)thiophen-2-yl]sulfonyl}-3-(4,4,4-trifluorobutyl)urea,
1-{[3-(3-fluoro-4{[2-(propan-2-yl)-1H-imidazol-1-yl]methyl}phenyl)-5-(2-methylpropyl)thiophen-2-yl]sulfonyl}-3-propylurea,
1-(3-{3-fluoro-4-[(2-methyl-1H-imidazol-1-yl)methyl]phenyl}-5-isobutyl-2-thienylsulfonyl)-3-propoxyurea,
3-(3-{3-fluoro-4-[(2-methyl-1H-imidazol-1-yl)methyl]phenyl}-5-(2,2,2-trifluoroethyl)-2-thienylsulfonyl)-1-(3,3,3-trifluoropropyl)urea, and
3-(3-{3,5-fifluoro-4-[(2-methyl-1H-imidazol-1-yl)methyl]phenyl}-5-isobutyl-2-thienylsulfonyl)-1-(3,3,3-trifluoropropyl)urea,
and pharmaceutically-acceptable salts thereof.

10. A pharmaceutical formulation comprising a compound as defined in claim 1 or a pharmaceutically acceptable salt thereof in admixture with a pharmaceutically- or cosmetically-acceptable, adjuvant, diluent or carrier.

11. A method of treatment of an autoimmune disease, a fibrotic disease, a chronic kidney disease, pulmonary hypertension, heart failure and/or myocardial infarction, which comprises administering an effective amount of a compound as defined in claim 1 or a pharmaceutically acceptable salt thereof to a patient in need of such treatment.

12. A method of treatment as claimed in claim 11, wherein the disease is an interstitial lung disease.

13. A method of treatment as claimed in claim 12, wherein the interstitial lung disease is idiopathic pulmonary fibrosis or sarcoidosis.

14. A method of treatment as claimed in claim 11, wherein the autoimmune disease is rheumatoid arthritis or systemic sclerosis.

15. A method of treatment as claimed in claim 11, wherein the chronic kidney disease is diabetic nephropathy.

16. A method of treatment as claimed in claim 11, wherein the pulmonary hypertension is pulmonary arterial hypertension.

17. A method of treatment as claimed in claim 11, wherein the heart failure is with preserved ejection fraction.

18. A process for the preparation of a compound of formula I as defined in claim 1, which process comprises:
(i) reaction of a compound of formula II,

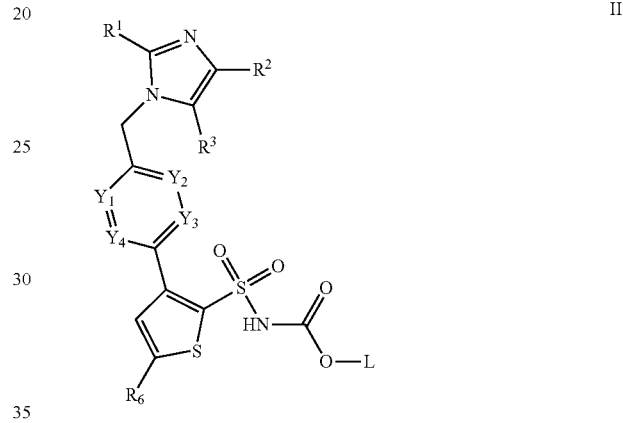

wherein L represents $C_{1-6}$ alkyl with a compound of formula III, $NHR^4R^5$   III;or (ii) for compounds of formula I in which $R^5$ represents H, reaction of a compound of formula IV,

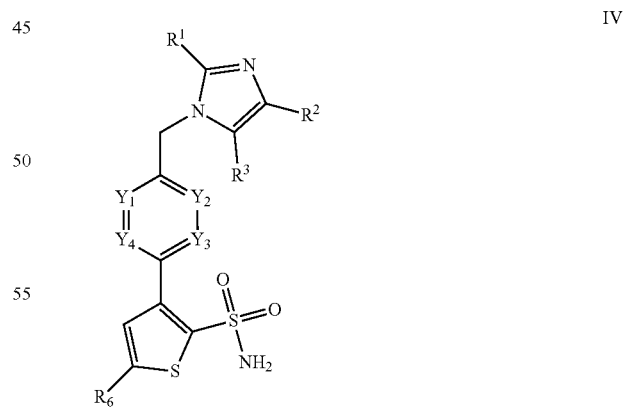

with a compound of formula V, $R^4$—N=C=O   V.

* * * * *